(12) United States Patent
Kim et al.

(10) Patent No.: US 10,997,268 B2
(45) Date of Patent: May 4, 2021

(54) METHOD FOR PROVIDING PUSH SERVICE USING WEB PUSH, AND ELECTRONIC DEVICE SUPPORTING SAME

(71) Applicant: Samsung Electronics Co., Ltd., Gyeonggi-do (KR)

(72) Inventors: Kwangsub Kim, Gyeonggi-do (KR); Seijin Lee, Seoul (KR); Changho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 16/061,100

(22) PCT Filed: Nov. 15, 2016

(86) PCT No.: PCT/KR2016/013121
§ 371 (c)(1),
(2) Date: Jun. 11, 2018

(87) PCT Pub. No.: WO2017/111313
PCT Pub. Date: Jun. 29, 2017

(65) Prior Publication Data
US 2018/0365255 A1  Dec. 20, 2018

(30) Foreign Application Priority Data
Dec. 21, 2015  (KR) ........................ 10-2015-0182735

(51) Int. Cl.
*G06F 15/16*  (2006.01)
*G06F 16/958*  (2019.01)
(Continued)

(52) U.S. Cl.
CPC .............. *G06F 16/958* (2019.01); *G06F 3/14* (2013.01); *G06F 16/9038* (2019.01);
(Continued)

(58) Field of Classification Search
CPC ............ H04L 67/02; H04L 67/26; G06F 3/14
See application file for complete search history.

(56) References Cited

U.S. PATENT DOCUMENTS

| 2015/0237500 | A1* | 8/2015 | Muddassir | ............ | H04L 63/101 |
| | | | | | 726/1 |
| 2015/0264095 | A1 | 9/2015 | Kim et al. | | |
| 2016/0028840 | A1* | 1/2016 | Krishnan | ................ | H04W 4/10 |
| | | | | | 709/204 |

FOREIGN PATENT DOCUMENTS

| KR | 10-1229951 B1 | 2/2013 |
| KR | 10-2013-0082937 A | 7/2013 |

(Continued)

*Primary Examiner* — Padma Mundur
(74) *Attorney, Agent, or Firm* — Cha & Reiter, LLC.

(57) ABSTRACT

The present disclosure relates to a method for providing a push service using a web push, and an electronic device supporting the same. Methods for providing a push service according to various embodiments of the present disclosure may comprise of: displaying a user interface of a software program; receiving a first web page from a first server associated with a push service according to a user's subscription when a first user input is detected in the user interface; displaying an indicator for the push service and the first web page; and transmitting a signal indicative of the push service subscription to a second server independent from the first server which manages a plurality of web sites for providing the push service when a second user input for the push service subscription is detected. Other embodiments are possible.

11 Claims, 18 Drawing Sheets

(51) Int. Cl.
*G06F 3/14* (2006.01)
*G06F 16/9038* (2019.01)
*H04L 29/08* (2006.01)

(52) U.S. Cl.
CPC .............. *H04L 67/02* (2013.01); *H04L 67/12* (2013.01); *H04L 67/26* (2013.01); *G06F 2221/2111* (2013.01)

(56) References Cited

FOREIGN PATENT DOCUMENTS

| KR | 10-2014-0021324 A | 2/2014 |
| KR | 10-2014-0045095 A | 4/2014 |
| KR | 10-2014-0081150 A | 7/2014 |
| KR | 10-2014-0092172 A | 7/2014 |
| KR | 10-1448593 B1 | 10/2014 |

* cited by examiner

METHOD FOR PROVIDING PUSH SERVICE USING WEB PUSH, AND ELECTRONIC DEVICE SUPPORTING SAME

CLAIM OF PRIORITY

This application is a National Phase Entry of PCT International Application No. PCT/KR2016/013121, which was filed on Nov. 15, 2016 and claims a priority to Korean Patent Application No. 10-2015-0182735, which was filed on Dec. 21, 2015, the contents of which are incorporated herein by reference.

TECHNICAL FIELD

Various embodiments of the present disclosure relate to a method of providing a push service using webpush and an electronic device supporting the same.

BACKGROUND ART

In general, a service company may provide a push service to a user through an to application or web. If the push service is provided to a user through a web, the push service may be provided to the user using the WWW/HTML standard.

DISCLOSURE OF INVENTION

Technical Problem

However, in the case of a website (e.g., a website using a contents management system (CMS), such as an installation type blog, or a portal space) not having the development ability, to provide the push service to a user through a web has a technical difficulty because script necessary for webpush must be modified or a separate push platform server API must be developed for push message transmission.

A method of providing a push service using webpush and an electronic device supporting the same according to various embodiments of the present disclosure enable service companies not having the development ability to easily provide a webpush service to a user through a web.

A method of providing a push service using webpush and an electronic device supporting the same according to various embodiments of the present disclosure can manage a list of websites that want to provide a user with a push service. Furthermore, the electronic device according to various embodiments of the present disclosure can provide a user interface for easily transmitting a push service to a user.

Solution to Problem

An electronic device according to various embodiments of the present disclosure to includes a communication unit configured to form wired/wireless communication, a display unit, an input unit separated from or coupled to the display unit, nonvolatile memory configured to store a software program configured at least partially for web browsing, and a processor electrically connected to the communication unit, the display unit, the input unit, and the nonvolatile memory, wherein the memory electrically connected to the processor, the nonvolatile memory may store instructions enabling the processor to display a user interface of the software program on the display unit, receive a first web page from a first server related to a push service based on a user's subscription through the communication unit in response to a first user input through the input unit, display an indicator for the push service in the first web page and the user interface, receive a second user input for the push service subscription through the input unit, and transmit a signal indicative of the push service subscription to a second server independent from the first server which manages a plurality of websites providing the push service through the communication unit.

A method of providing a push service using webpush according to various embodiments of the present disclosure may include an operation of displaying a user interface of a software program; receiving a first web page from a first server related to a push service based on a user's subscription when a first user input is detected in the user interface; displaying the first web page and an indicator for the push service; and transmitting a signal indicative of the push service subscription to a second to server independent from the first server which manages a plurality of websites for the push service when a second user input for the push service subscription is detected.

Advantageous Effects of Invention

The method of providing a push service using webpush and the electronic device supporting the same according to various embodiments of the present disclosure can provide a user with a webpush service for increasing the participation rate of a user even without installing an additional application.

Furthermore, the electronic device according to various embodiments of the present disclosure can easily provide a push service to a user even without performing a separate modification operation by providing a user interface for the push service.

BEST MODE FOR CARRYING OUT THE INVENTION

Figure 1:
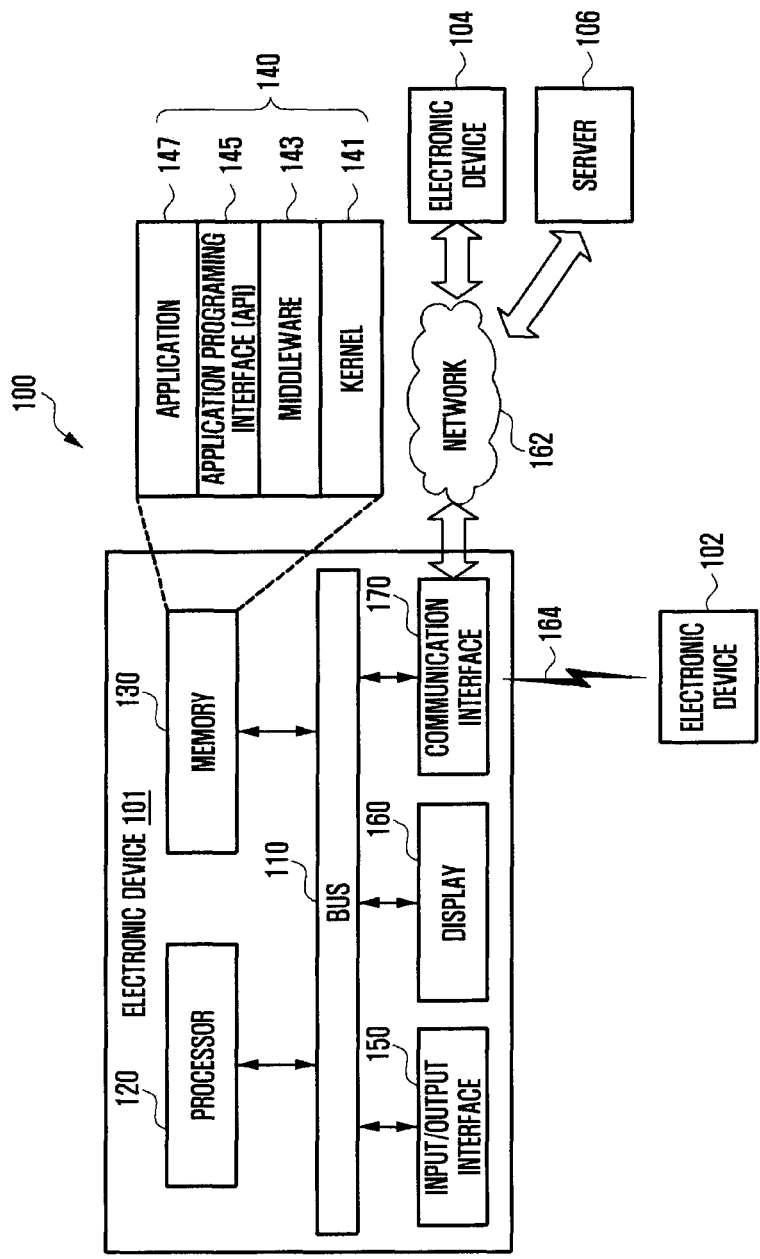
FIG. 1 is a block diagram showing a network environment according to various embodiments of the present disclosure.

Hereinafter, the present disclosure is described with reference to the accompanying drawings. Although specific embodiments are illustrated in the drawings and related detailed descriptions are discussed in the present specification, the present disclosure ft) may have various modifications and several embodiments. However, embodiments of the present disclosure are not limited to a specific implementation form and it should be understood that the present disclosure includes all changes and/or equivalents and substitutes included in the spirit and scope of embodiments of the present disclosure. In connection with descriptions of the drawings, similar components are designated by the same reference numeral. An expression of the singular number may include an expression of the plural number unless clearly defined otherwise in the context. In embodiments of the present disclosure, the expressions "or" or "at least one of A or/and B" include any or all of combinations of words listed together. For example, the expressions "A or B" or "at least A or/and B" may include A, B, or both A and B. The terms "1", "2", "first", or "second" used in embodiments of the present disclosure may modify various components of the embodiments but do not limit the corresponding components. When it is stated that one (e.g., a first) component is "(operatively or communicatively) coupled to" or "connected to" other (e.g., a second) component, the component may be directly coupled or connected to other component or may be connected to the other through another component (e.g., a third component).

According to embodiments of the present disclosure, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor, such as an embedded processor or a generic-purpose processor, such as a central processing unit (CPU) or application processor that may execute one or more software programs stored in a memory device to perform corresponding functions.

According to embodiments of the present disclosure, examples of the electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device. Examples of the wearable device may include an accessory type device (such as, watch, ring, bracelet, ankle bracelet, necklace, glasses, contact lens, and head-mounted device (HMD), a textile or clothes type device such as electronic clothes, a body-attached type such as a skin pad and tattoo, and a bio-implemented type. Examples of the electronic device may include a television, a digital video disc (DVD) player, an audio player, a refrigerator, an air conditioner, a cleaner, an oven, a microwave oven, a laundry machine, an air purifier, a set-top box, a home automation control panel, a security control panel, a media box such as Samsung HomeSync™, apple TV™, and google TV™, a game console such as Xbox™ and PlayStation™, an electronic dictionary, an electronic key, a camcorder, and an electronic frame.

According to an embodiment, examples of the electronic device may include a medical device (such as portable medical sensors (including glucometer, heart rate sensor, tonometer, and body thermometer), magnetic resonance angiography (MRA) device, magnetic resonance imaging (MRI) device, computed tomography (CT) device, camcorder, and microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), an automotive head unit, an industrial or household robot, an automated teller machine (ATM), a point of sales (POS) terminal, and an Internet-of-Things (IoT) device, such as an electric light bulb, sensor, sprinkler system, fire alarm system, temperature controller, street lamp, toaster, fitness equipment, hot water tank, heater, and boiler. According to an embodiment of the present disclosure, examples of the electronic device may include furniture, a building/structure, a part of a vehicle, an electronic board, an electronic signature receiving device, a projector, and a sensor (such as water, electricity, gas, and electric wave meters). The electronic device may be flexible or a combination of at least two of the aforementioned devices, but the electronic device is not limited to the aforementioned devices. In the present disclosure, the term "user" may denote a person who uses the electronic device or an artificial intelligence electronic device which uses the electronic device.

FIG. 1 is a block diagram showing a network environment according to various embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component. The bus 110 may be a circuit connecting the above described components and transmitting communication, such as a control message between the above described components. The processor 120 may include one or more of a central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101, and may store software and/or program 140. For example, the program 140 may include a kernel 141, middleware 143, an application programming interface (API) 145, and/or applications 147. At least one portion of the kernel 141, the middleware 143 and the API 145 may be defined as operating system (OS). The kernel 141 controls or manages system resources, such as the bus 110, the processor 120, or the memory 130, used for executing an operation or function implemented by the remaining other program, for example, the middleware 143, the API 145, or the applications 147. The kernel 141 provides an interface for accessing individual components of the electronic device 101 from the middleware 143, the API 145, or the applications 147 to control or manage the components.

The middleware 143 performs a relay function of allowing the API 145 or the applications 147 to communicate with the kernel 141 to exchange data. Further, in operation requests received from the applications 147, the middleware 143 performs a control for the operation requests, such as scheduling or load balancing, by using a method of assigning a priority, by which the system resources of the electronic device 101 may be used, to the applications 147. The API 145 is an interface by which the applications 147 may control a function provided by the kernel 141 or the middleware 143 and includes, for example, at least one interface or function for a file control, a window control, image processing, or a character control. The input/output interface 150 may be interface to transmit command or data inputted by a user or another external device to another component(s) of the electronic device 101. The input/output interface 150 may output the command or data received from the other component(s) of the electronic device 101 to the user or the other external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user. The communication interface 170 may set communication of the electronic device 101 and an external device, such as a first external device 102, a second external device 104, or a server 106. For example, the communication interface 170 may be connected with the network 162 through wireless communication or wire communication and communicate with the external device, such as, a second external device 104 or server 106).

Wireless communication may use, as cellular communication protocol, at least one of LTE (long-term evolution), LTE-A (LTE Advanced), CDMA (code division multiple access), WCDMA (wideband CDMA), UMTS (universal mobile telecommunications system), WiBro (wireless broadband), and GSM (global system for mobile Communications) for example. A short-range communication 164 may include, for example, at least one of Wi-Fi, Bluetooth, near field communication (NFC), magnetic secure transmission or near field magnetic data stripe transmission (MST), and global navigation satellite system (GNSS). The GNSS may include at least one of, for example, a global positioning system (GPS), a global navigation satellite system (Glonass), a Beidou navigation satellite system (Beidou), and Galileo (European global satellite-based navigation system). Hereinafter, GPS may be interchangeably used with GNSS in the present disclosure. Wired communication may include, for example, at least one of USB (universal serial bus), HDMI (high definition multimedia interface), RS-232 (recommended standard-232), and POTS (plain old telephone service). The network 162 may include a telecommunication network, for example, at least one of a computer network, such as LAN (local area network) or WAN (wide area network), the Internet, and a telephone network.

Each of the first external device 102 and the second external device 104 may be the same as or a different type of device than the electronic device 101. According to some embodiment, the server 106 may include one or more group of servers. At least one portion of executions executed by the electronic device may be performed by one or more electronic devices, such as external electronic device 102, 104, or server 106. When the electronic device 101 should perform a function or service automatically, the electronic device 101 may request performing of at least one function to the other device. For the above, cloud computing technology, distributed computing technology, or client-server computing technology may be used, for example.

Figure 2:
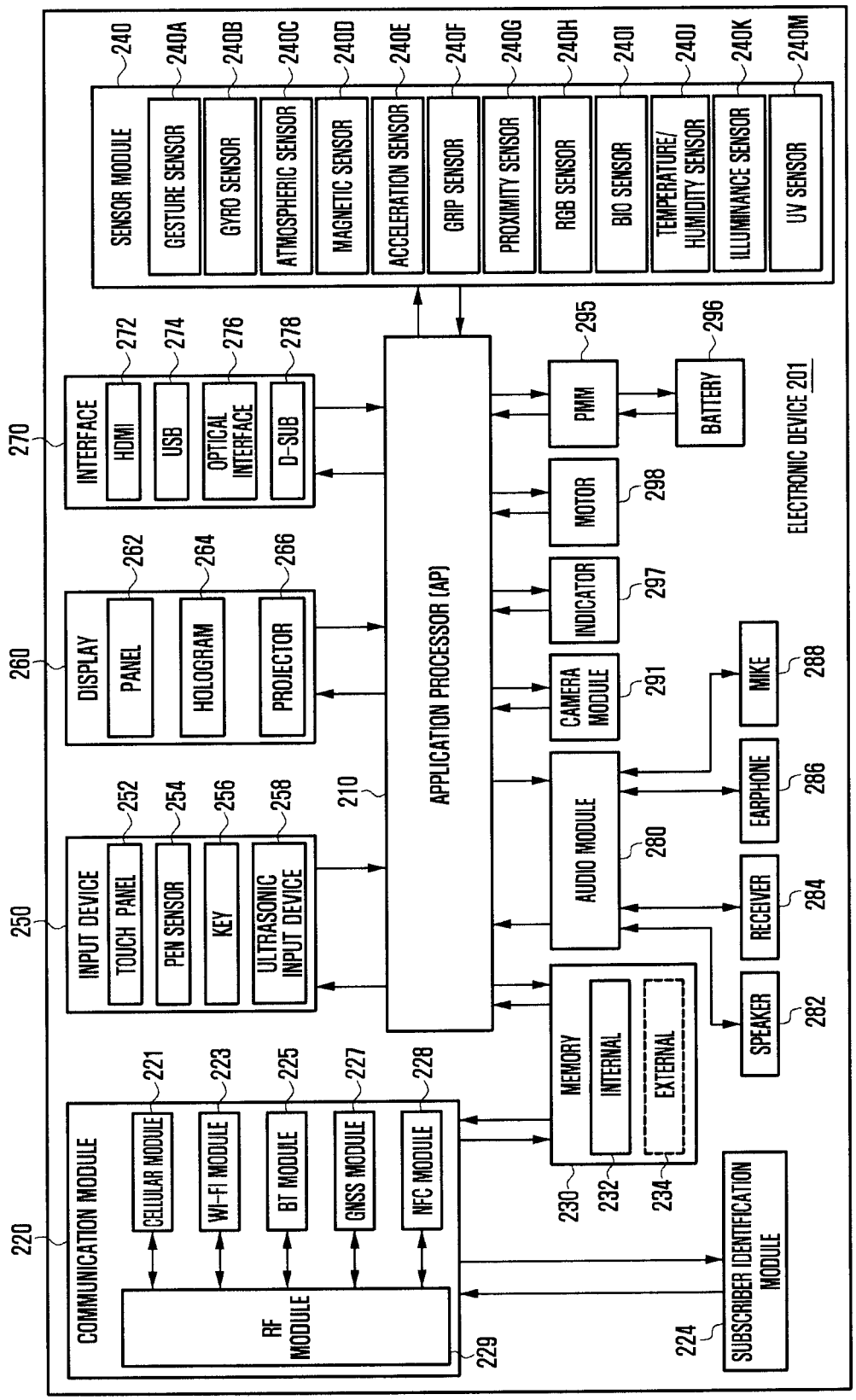
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may configure all or a part of the electronic device 101 illustrated in FIG. 1. The electronic device 201 includes one or more APs 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298. The AP 210 operates an OS or an application program so as to control a plurality of hardware or software component elements connected to the AP 210 and execute various data processing and calculations including multimedia data. The AP 210 may be implemented by a system on chip (SoC), for example. According to an embodiment, the processor 210 may further include a graphics processing unit (GPU) and/or image signal processor. The AP 210 may include at least one portion of components illustrated in FIG. 2, such as a cellular module 221. The AP 210 may load command or data received from at least one of another component, such as a non-volatile memory, and store various data in the non-volatile memory.

The communication module 220 may include same or similar components with the communication interface 170 of FIG. 1, and may include the cellular module 221, a Wi-Fi module 223, a BT module 225, a GPS module 227, a NFC module 228, and a radio frequency (RF) module 229. The cellular module 221 provides a voice, a call, a video call, a short message service (SMS), or an Internet service through a communication network, such as LTE, LTE-A, CDMA, WCDMA, UMTS, WiBro, or GSM. The cellular module 221 may distinguish and authenticate electronic devices within a communication network by using a SIM card 224. According to an embodiment, the cellular module 221 performs at least some of the functions which may be provided by the AP 210. For example, the cellular module 221 may perform at least some of the multimedia control functions, and may include a CP. Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least two of the cellular module 221, the Wi-Fi module 223, the BT module 225, the GPS module 227, and the NFC module 228 may be included in one integrated chip (IC) or one IC package according to one embodiment. For example, at least the CP corresponding to the cellular module 221 and the Wi-Fi processor corresponding to the Wi-Fi module 223 of the processors corresponding to the cellular module 221, the Wi-Fi module 223, the BT module 225, the GPS module 227, and the NFC module 228 may be implemented by one SoC. The RF module 229 transmits/receives data, such as an RF signal and may include, for example, a transceiver, a power amp module (PAM), a frequency filter, and a low noise amplifier (LNA). The RF module 229 may further include a component for transmitting/receiving electronic waves over a free air space in wireless communication, for example, a conductor or a conducting wire. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment. The SIM card 224 includes a SIM and may be inserted into a slot formed in a particular portion of the electronic device. The SIM card 224 includes unique identification information, such as an integrated circuit card identifier (ICCID) or subscriber information, such as an international mobile subscriber identity (IMSI).

The memory 230 may include an internal memory 232 or an external memory 234. The internal memory 232 may include, for example, at least one of a volatile memory, such as, a random access memory (RAM), a dynamic RAM (DRAM), a static RAM (SRAM), and a synchronous dynamic RAM (SDRAM) and a non-volatile Memory, such as, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. According to an embodiment, the internal memory 232 may be a solid state drive (SSD). The external memory 234 may further include a flash drive, such as a compact flash (CF), a secure digital (SD), a micro-SD, a mini-SD, an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H, such as, red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 240 may further include a control circuit for controlling one or more sensors included in the sensor module 240. In embodiments, the electronic device 201 is capable of including a processor, configured as part of the processor 210 or a separate component, for controlling the sensor module 240. In this case, while the processor 210 is operating in a sleep mode, the processor is capable of controlling the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer that provides a tactile reaction to the user. The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 may detect an acoustic wave by a microphone 288 of the electronic device 201 through an input means generating an ultrasonic signal to identify data and may perform wireless recognition.

The display 260 includes a panel 262, a hologram device 264, and a projector 266. The panel 262 may be, for example, a LCD or an active matrix OLED (AM-OLED). The panel 262 may be implemented to be flexible, transparent, or wearable and may be configured by the touch panel 252 and one module. The hologram device 264 displays a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266. The interface 270 includes, for example, a HDMI 272, an USB 274, an optical interface 276, and a D-subminiature (D-sub) 278, and may be included in, for example, the communication interface 170 illustrated in FIG. 1. Additionally or alternatively, the interface 270 may include, for example, a mobile high-definition link (MAL) interface, an SD card/multi-media card (MMC) interface, or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, or the microphone 288. The camera module 291 may photograph a still image and a video, and may include one or more image sensors, such as a front sensor or a back sensor, an image signal processor (ISP) or a flash, such as an LED (light emitting diode) or a xenon lamp. The power managing module 295 manages power of the electronic device 201. The power managing module 295 may include, for example, a power management integrated circuit (PMIC), a charger IC, or a battery gauge. The PMIC may be mounted to, for example, an integrated circuit or a SoC semiconductor. A charging method may be divided into wired and wireless methods. The charger IC charges a battery and prevents over-voltage or over-current from flowing from a charger. According to an embodiment, the charger IC includes a charger IC for at least one of the wired charging method and the wireless charging method. The wireless charging method may include, for example, a magnetic resonance, magnetic induction and electromagnetic wave method, and additional circuits for wireless charging, such as a coil loop, a resonant circuit, and a rectifier may be added. The battery gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 displays particular statuses of the electronic device 201 or a part of the electronic device 201, such as a booting, message, or charging status. The motor 298 converts an electrical signal to a mechanical vibration. The electronic device 201 may include a processing unit, such as a GPU for supporting a mobile TV. The processing unit for supporting the mobile TV may process, for example, media data according to a standard of digital multimedia broadcasting (DMB), digital video broadcasting (DVB), or media flow. Each of the components of the electronic device according to embodiments of the present disclosure may be implemented by one or more components and the name of the corresponding component may vary depending on a type of the electronic device. The electronic device according to embodiments of the present disclosure may include at least one of the above described components, a few of the components may be omitted, or additional components may be further included. Some of the components of the electronic device according to embodiments of the present disclosure may be combined to form a single entity, and thus may equivalently execute functions of the corresponding components before being combined.

Figure 3:
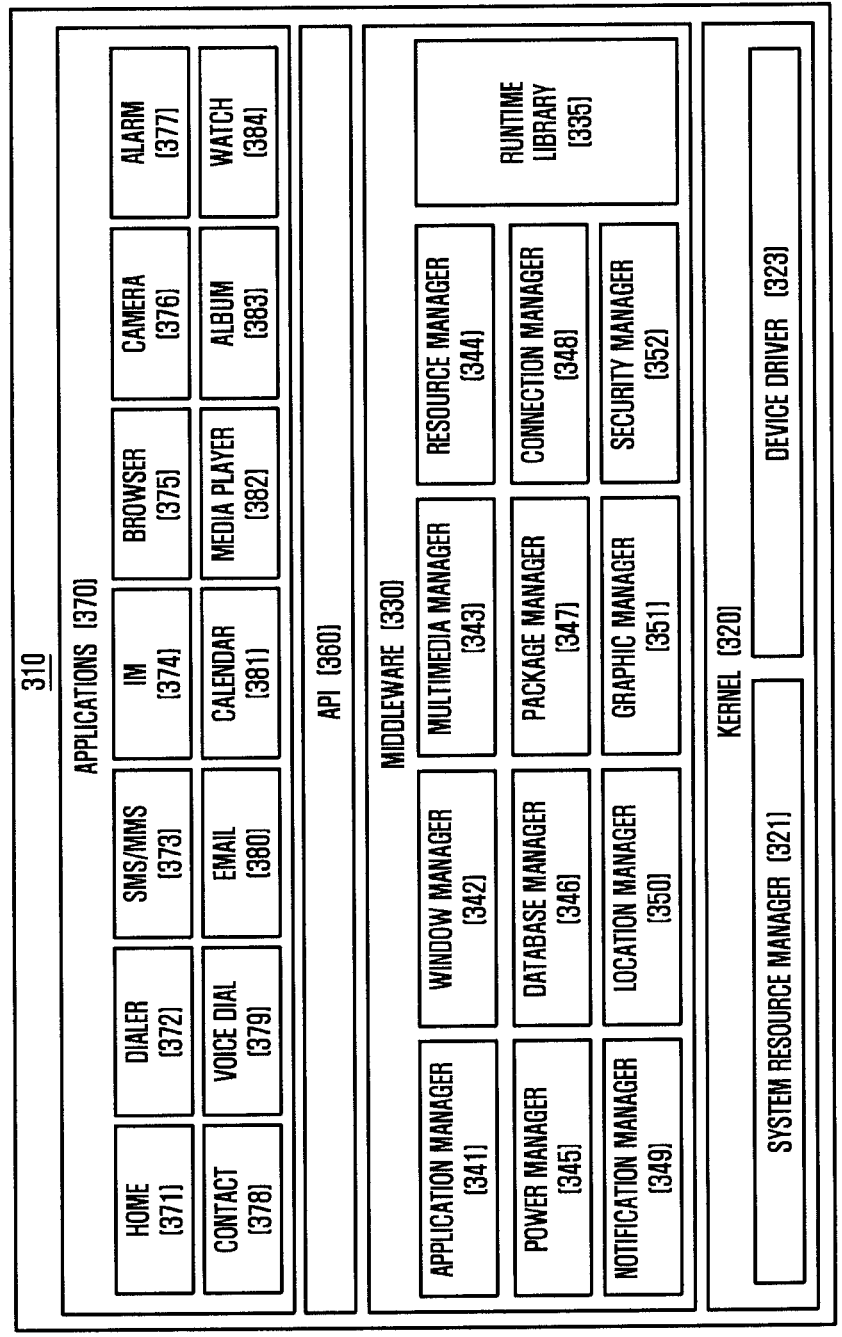
FIG. 3 is a block diagram of a program module according to various embodiments of the present disclosure.

FIG. 3 is a block diagram illustrating a programming module according to embodiments of the present disclosure. Referring to FIG. 3, a programming module 310 may be stored in the electronic apparatus 100, e.g. the memory 130, as illustrated in FIG. 1. At least a part of the programming module 310 may be configured by software, firmware, hardware, and/or combinations of two or more thereof. The programming module 310 may include an OS that is implemented in hardware 200 to control resources related to an electronic device 100, and/or various applications driven on the OS. For example, the OS may be Android™, iOS™, Windows™, Symbian™, Tizen™, or Bada™. Referring to FIG. 3, the programming module 310 may include a kernel 320 (e.g., kernel 141), middleware 330 (e.g., middleware 143), an API 360 (e.g., API 145), and the applications 370 (e.g., applications 147). At least part of the program module 310 may be preloaded on the electronic device or downloaded from an external device (e.g., external device 102, 104, server 106).

The kernel 320 may include a system resource manager 321 and/or a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a Wi-Fi driver, and an audio driver and an inter-process communication (IPC) driver. The middleware 330 may include a plurality of modules implemented in advance for providing functions commonly used by the applications 370. The middleware 330 may provide the functions through the API 360 such that the applications 370 may efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function. The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370. The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, and a proximity notification, in such a manner that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus 100 has a telephone call function, the middleware 330 may further include a telephony manager for managing a voice and/or video communication function of the electronic apparatus. The middleware 330 may generate and use a new middleware module through various functional combinations of the aforementioned internal element modules. The middleware 330 may provide modules specialized according to types of OSs in order to provide differentiated functions. The middleware 330 may dynamically remove some of the existing elements and/or add new elements, and may exclude some of the elements described in the embodiments of the present disclosure, further include other elements, and/or substitute the elements with elements having a different name and performing a similar function. The API 360 is a set of API programming functions, and may be provided with a different configuration according to the OS. For example, in Android or iOS, one API set may be provided for each of platforms, and in Tizen, two or more API sets may be provided.

The applications 370 may include applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care, such as an application for measuring amount of exercise or blood sugar level, and environment information, such as, an application for providing atmospheric pressure, humidity, or temperature. According to an embodiment, the applications 370 are capable of including an application for supporting information exchange between an electronic device and an external device. The information exchange application is capable of including a notification relay application for relaying specific information to external devices or a device management application for managing external devices. For example, the notification relay application is capable of including a function for relaying notification information, created in other applications of the electronic device, such as a short messaging service/multimedia messaging service (SMS/MMS) application, email application, health care application, or environment information application to external devices. In addition, the notification relay application is capable of receiving notification information from external devices to provide the received information to the user. The device management application is capable of managing at least one function of an external device communicating with the electronic device. Examples of the function are turning-on/off the external device or part of the external device, controlling the brightness (or resolution) of the display, applications running on the external device, and services provided by the external device such as a call or messaging service. According to an embodiment, the applications 370 may include a health care application of a mobile medical device, and specified attributes of an external device. The applications 370 are capable of including applications received from an external device, and a pre-loaded application or third party applications that can be downloaded from a server. It should be understood that the components of the program module 310 may be called different names according to types of operating systems. According to embodiments, at least part of the program module 310 can be implemented with software, firmware, hardware, or any combination of two or more of them. At least part of the program module 310 can be implemented by a processor. At least part of the programming module 310 may include modules, programs, routines, sets of instructions or processes, etc., in order to perform one or more functions.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof, may be a minimum unit performing at least one function and/or a part thereof; and may be mechanically and/or electronically implemented. For example, the "module" according to the present disclosure may include at least one of an application-specific IC (ASIC) chip, a field-programmable gate arrays (FPGA), and a programmable-logic device for performing operations which have been known and/or are to be developed. According to embodiments, at least part of the devices or the method according to the present disclosure may be implemented by a command stored in a computer-readable storage medium in a programming module form. When the instructions are executed by at least one processor, the at least one processor may perform functions corresponding to the instructions. The computer-readable storage medium may be, for example, the memory 130. At least a part of the programming module may be implemented by the processor 120. At least some of the programming modules may include, for example, a module, a program, a routine, a set of instructions or a process for performing one or more functions. The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction, such as a ROM, a RAM, or a flash memory. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa. The module or programming module of the present disclosure may include at least one of the aforementioned components with omission of some components or addition of other components. The operations of the modules, programming modules, or other components may be executed in series, in parallel, recursively, or heuristically. Some operations may be executed in a different order, omitted, or extended with other operations.

In various embodiments of the present disclosure, the electronic device may receive a push message from the server using webpush. In order to receive the push message from the server using webpush, the electronic device may use a push platform and service worker technology for maintaining a continued connection so as to receive the push service. The service worker is a technology for supporting background Javascript. In various embodiments of the present disclosure, in order for the push service to be received, an operation of installing the service worker may be performed. The service worker may be located a web browser within a webpush provision server or an electronic device. The electronic device may receive a specific signal of a platform level and perform a specific work in background although the web browser is not executed through the service worker. For example, when a specific signal is transmitted in a platform level, the service worker may process the transmitted specific signal (e.g., display a pop-up window or open a corresponding page). The server may transmit a push service to the push platform using an electronic device ID. The service worker may perform a work of generating a notification message by analyzing the transmitted push service.

Figure 4:
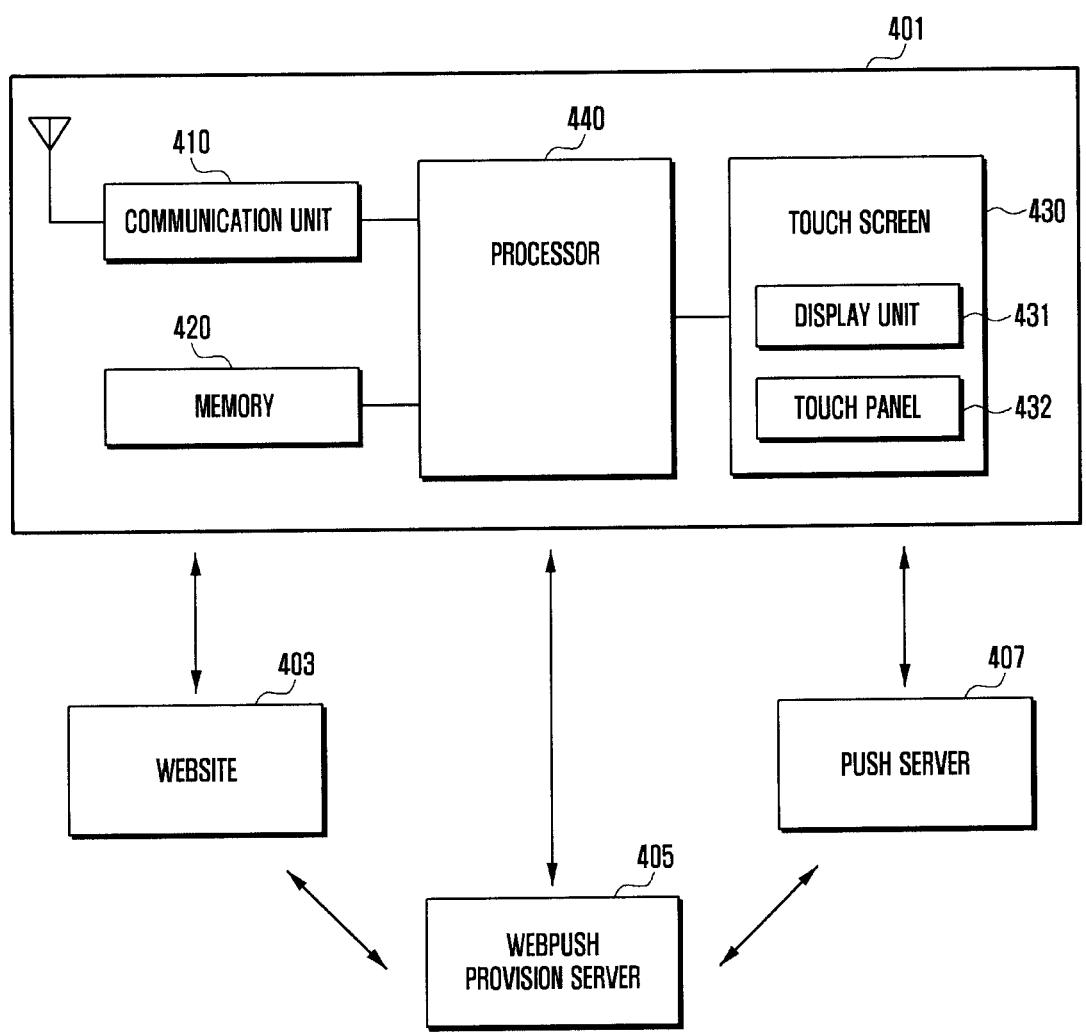
FIG. 4 is a diagram showing a system providing a push service using webpush according to various embodiments of the present disclosure.

FIG. 4 is a diagram showing a system providing a push service using webpush according to various embodiments of the present disclosure.

Referring to FIG. 4, the system for providing a push service according to an embodiment of the present disclosure may include an electronic device 401, a website 403, a webpush provision server 405, and a push server 407.

In various embodiments of the present disclosure, the electronic device 401 may include a communication unit 410, memory 420, a touch screen 430, and a processor 440.

In various embodiments of the present disclosure, the electronic device 401 may receive a service worker from the webpush provision server 405 at operation of agreeing on push service reception through the communication unit 410 (e.g., the communication interface 170 of FIG. 1, the communication module 220 of FIG. 2). The electronic device 401 may request the webpush provision server 405 to generate the ID of the electronic device 401 through the communication unit 410. The electronic device 401 may receive the ID of the electronic device 401, generated by the webpush provision server 405, through the communication unit 410. The electronic device 401 may receive a push message, transmitted by the administrator (e.g., a webpush transmission electronic device) of the website 403 through the communication unit 410, from the push server 407.

In various embodiments of the present disclosure, the memory 420 (e.g., the memory 130 of FIG. 1, the memory 230 of FIG. 2) may store a program related to a web browser. Alternatively, the memory 420 may store a website list providing a push service.

The touch screen 430 may include a display unit 431 and a touch panel 432. The display unit 431 (e.g., the display 160 of FIG. 1, the display 260 of FIG. 2) may display a specific website through a web browser. When the specific website is included in a white list, the display unit 431 may display a push service icon or pop-up window regarding whether a push service is received. When a push service, e.g., a push message is received, the display unit 431 may display a push message notification icon in a pop-up window or state bar for the push message notification.

The touch panel 432 (e.g., the input device 250 of FIG. 2) may sense an input for receiving a push service in a push service icon or pop-up window displayed on the display unit 431 regarding whether a push service is received. The touch panel 432 may sense an input for selecting content (e.g., URL) included in a received push message.

In various embodiments of the present disclosure, the processor 440 (e.g., the processor 120 of FIG. 1, the processor 210 of FIG. 2) may receive a white list from the webpush provision server 405 through the communication unit 410 and store it in the memory 420. The processor 440 may execute a web browser so that a specific website screen is displayed on the display unit 431.

In various embodiments of the present disclosure, the processor 440 may determine whether a specific website is included in a white list stored in the memory 420. If the specific website is included in the white list, the processor 440 may request a service worker to the webpush provision server 405. The processor 440 may receive the service worker from the webpush provision server 405 and install the received service worker. In various embodiments of the present disclosure, after installing the service worker, the processor 440 may determine whether the push service of the specific website is received. For example, after installing the service worker, the processor 440 may display a pop-up window or push service icon regarding whether the push service of the specific website is received. When an input for receiving the push service from the specific website is detected through the pop-up window or the push service icon, the processor 440 may determine that the push service of the specific website is received.

In various embodiments of the present disclosure, if the specific website is included in the white list stored in the memory 420, the processor 440 may display a pop-up window or push service icon regarding whether the push service of the specific website is received. When an input for receiving the push service from the website is detected through the pop-up window or the push service icon, the processor 440 may determine that the push service of the specific website is received and request a service worker to the webpush provision server 405. The processor 440 may receive the service worker from the webpush provision server 405 and install the received service worker.

In various embodiments of the present disclosure, when the push service of the specific website is received, the processor 440 may request the ID of the electronic device 401 to the webpush provision server 405. The webpush provision server 405 may generate the ID of the electronic device 401. The processor 440 may receive the generated ID of the electronic device 401 from the webpush provision server 405. The processor 440 may transmit the received ID of the electronic device 401 to the webpush provision server 405 or the website 403. Alternatively, the website 403 may obtain the ID from the electronic device 401. The processor 440 may receive a push message corresponding to the ID of the electronic device 401 from the push server 407 through the service worker of the electronic device 401, and may display the received push message.

Alternatively, in various embodiments of the present disclosure, if the specific website is included in the white list stored in the memory 420, the processor 440 may search whether a service worker is present in the web browser of the electronic device 401. If the service worker is present within the web browser, the processor 440 may install the service worker. After installing the service worker, the processor 440 may determine whether the push service of the specific website is received. If the push service of the specific website is received, the processor 440 may request the ID of the electronic device 401 to the webpush provision server 405. The webpush provision server 405 may generate the ID of the electronic device 401. The processor 440 may receive the generated ID of the electronic device 401 from the webpush provision server 405. The processor 440 may transmit the received ID of the electronic device 401 to the webpush provision server 405 or the website 403. Alternatively, the website 403 may obtain the ID from the electronic device 401. The processor 440 may receive a push message corresponding to the ID of the electronic device 401 from the push server 407 through the service worker, and may display the received push message.

In various embodiments of the present disclosure, the electronic device 401 includes the communication unit 410 forming wired/wireless communication, the display unit 431, an input unit separated from or combined with the display unit 431, memory 420 storing a software program configured at least partially for web browsing, and the processor 440 electrically connected to the communication unit 410, the display unit 431, the input unit, and the memory 420, wherein the memory 420 stores instructions for the processor 440 to display the user interface of the software program on the display unit 431, to receive a first web page from a first server (e.g., the website 403) related to a push service based on a user's subscription through the communication unit 410 in response to a first user input through the input unit, to display an indicator for a push service in the first web page and the user interface, to receive a second user input for push service subscription through the input unit, and to transmit a signal indicative of the push service subscription to a second server (e.g., the webpush provision server 405) that is independent from the first server (e.g., the website 403) which manages a plurality of websites for providing the push service through the communication unit 410.

In various embodiments of the present disclosure, the instructions comprise instructions for the processor 440 to receive data related to the push service from a third server (e.g., the push server 407) independent from the second server (e.g., the webpush provision server 405) through the communication unit 410 and to provide push service notification through the display unit in response to the received data.

In various embodiments of the present disclosure, the instructions comprise instructions for the processor 440 to determine whether the first server (e.g., the website 403) provides the push service at least partially based on information of the second server (e.g., the webpush provision server 405) and to display an indicator at least partially based on a determination of the first server (e.g., the website 403) regarding whether it provides the push service.

In various embodiments of the present disclosure, the information may be a list including a plurality of websites providing the push service.

In various embodiments of the present disclosure, the instructions comprise instructions for the processor 440 to request a service worker necessary to a push service from the second server (e.g., the webpush provision server 405) when the first server (e.g., the website 403) provides the push service, to receive the service worker from the second server (e.g., the webpush provision server 405), and to install the service worker.

In various embodiments of the present disclosure, the instructions comprise instructions for the processor 440 to identify whether a service worker necessary for a push service has been stored in the electronic device 401 when the first server (e.g., the website 403) provides the push service, and to install the service worker through the browser engine of the electronic device 401 if, as a result of the identification, the service worker has been stored in the electronic device 401.

In various embodiments of the present disclosure, the instructions comprise instructions for the processor 440 to request the ID of the electronic device 401 to the second server (e.g., the webpush provision server 405) when the second user input is received in the indicator for a push service after the service worker is installed and to receive the ID of the electronic device 401 from the second server (e.g., the webpush provision server 405).

In various embodiments of the present disclosure, the instructions comprise instructions for the processor 440 to transmit the ID of the electronic device 401 to the first server (e.g., the website 403) or the second server (e.g., the webpush provision server 405).

In various embodiments of the present disclosure, the instructions comprise instructions for the processor 440 to receive a push message corresponding to the ID of the electronic device 401 from the third server (e.g., the push server 407) through the service worker.

In various embodiments of the present disclosure, the indicator for the push service may include a pop-up window or push service icon regarding whether the push service is received.

In accordance with one embodiment, although not shown in FIG. 4, the electronic device 401 may optionally further include elements having additional functions, such as a global positioning system (GPS) module for location information reception, a camera module for image or moving image photographing, and a broadcasting reception module for broadcasting reception.

In various embodiments of the present disclosure, the website 403 means the subject to provide a push service to the electronic device 401, and may include, for example, medium and small enterprise websites and a nonbusiness famous website (e.g., a website using CMS, such as an installation type blog, or a portal space). Alternatively, the website 403 may include a webpush transmission electronic device, a website server or a webpush service server.

In various embodiments of the present disclosure, the webpush provision server 405 may permit the provision of the webpush service of the website 403 to the electronic device 401. The webpush provision server 405 may register the website 403 whose provision of a webpush service has been permitted with a white list, may manage the white list, and may provide a webpush service.

In various embodiments of the present disclosure, the push server 407 may change a push message, received from the webpush provision server 405, into a push platform corresponding to the ID of the electronic device 401, and may transmit it to the electronic device 401. For example, the push server 407 may include Google cloud messaging (GCM) or Samsung push platform (SPP).

Figure 5:
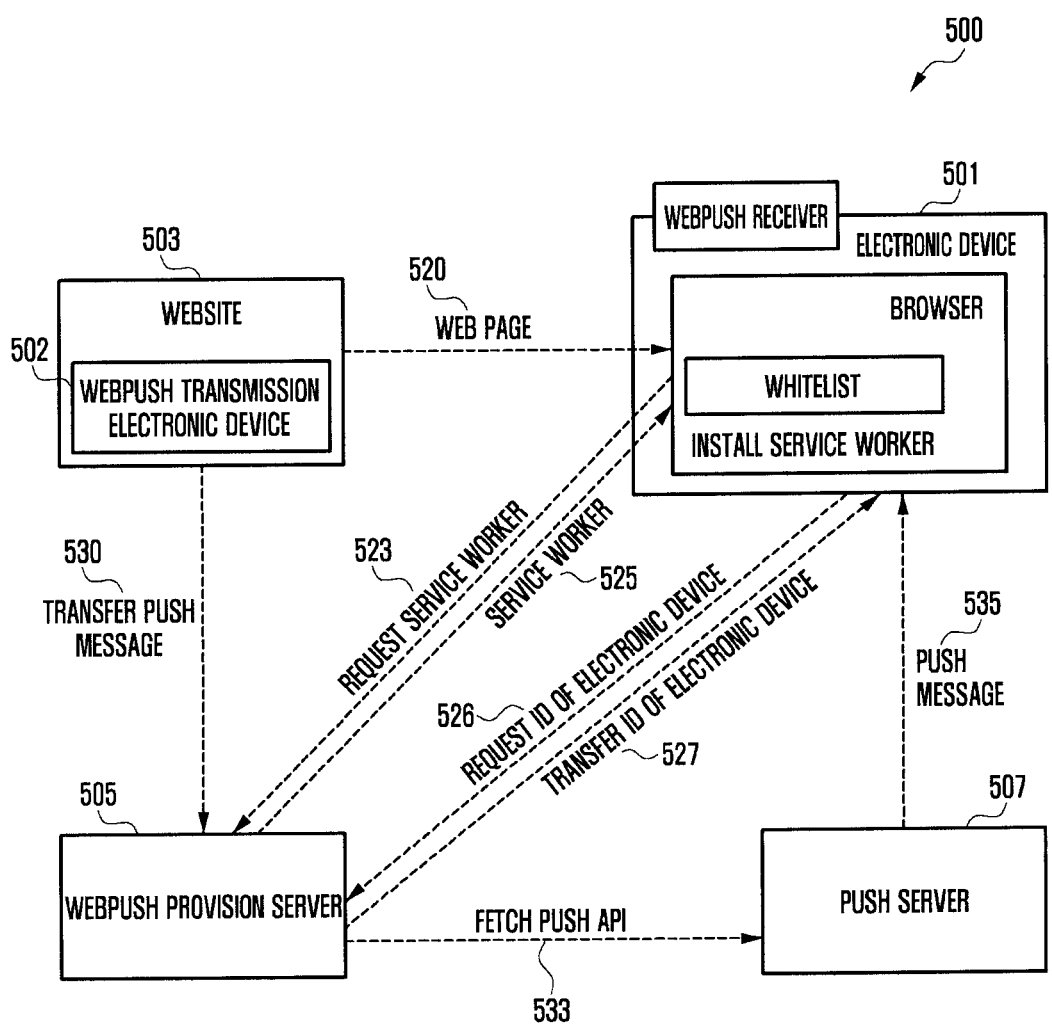
FIG. 5 is a diagram showing a system providing a push service using webpush according to various embodiments of the present disclosure.

The aforementioned website 403, the webpush provision server 405, and the push server 407 are described in detail through FIG. 5.

FIG. 5 is a diagram showing a system providing a push service using webpush according to various embodiments of the present disclosure.

Referring to FIG. 5, in various embodiments of the present disclosure, the system 500 for providing a push service may include an electronic device 501 (e.g., the electronic device 401 of FIG. 4), a website 503 (e.g., the website 403 of FIG. 4), a webpush provision server 505 (e.g., the webpush provision server 405 of FIG. 4), and a push server 507 (e.g., the push server 407 of FIG. 4).

In various embodiments of the present disclosure, the electronic device 501 may execute a web browser. When the electronic device 501 accesses a specific website by executing a web browser, it may receive a web page 520 from the website 503 and output the web page 520.

In various embodiments of the present disclosure, the website 503 means the subject that provides a push service or web page to the electronic device 501. For example, the website 503 may include medium and small enterprise websites and a nonbusiness famous website (e.g., a website using CMS, such as an installation type blog, or a portal space). Alternatively, the website 503 may include a webpush transmission electronic device 502, a website server or a webpush service server.

In various embodiments of the present disclosure, the webpush provision server 505 may permit the provision of the webpush service of the website 503 to the electronic device 501. The webpush provision server 505 may register the website 503 whose provision of a webpush service has been permitted with a white list, and may manage the website 503. Alternatively, the webpush provision server 505 may transmit a white list, including a plurality of websites whose provision of a webpush service has been permitted, to the electronic device 501. For example, the webpush provision server 505 may transmit the entire white list or some (e.g., only an added/changed website) of the white list to the electronic device 501. The electronic device 501 may store the white list, received from the webpush provision server 505, in the memory. In one embodiment, if a white list has been stored in the memory, the electronic device 501 may update the stored white list based on the white list received from the webpush provision server 505.

In various embodiments of the present disclosure, the electronic device 501 may determine whether a specific website accessed through a web browser provides a push service. The electronic device 501 may determine whether the specific website is a site providing a push service through a white list stored in the memory. For example, if the specific website is included in the white list, the electronic device 501 may determine that the specific website provides a push service. When the specific website is included in the white list and determined to be a site providing a push service, the electronic device 501 may install a service worker necessary for a webpush service. In various embodiments of the present disclosure, the service worker may be located at a remote place, and the electronic device 501 may receive the service worker and install it in a <script> injection manner. In various embodiments of the present disclosure, the service worker may have been stored in the electronic device 501, and the electronic device 501 may install the service worker.

In various embodiments of the present disclosure, if the service worker is located at a remote place and installed using the script injection manner, the electronic device 501 may request (523) the service worker to the webpush provision server 505. In response thereto, the webpush provision server 505 may transmit (525) the service worker to the electronic device 501. The electronic device 501 may install the service worker received from the webpush provision server 505.

In accordance with one embodiment, the service worker may have been stored in the electronic device 501. For example, if a specific website provides a push service, the electronic device 501 may install the stored service worker necessary for a webpush service.

When the service worker is installed, the electronic device 501 may determine whether the push service of the specific website is received. For example, when the service worker is installed, the electronic device 501 may display a pop-up window or push service icon regarding whether the push service of the specific website is received. The pop-up window may be a pop-up window querying as to whether the push service of the specific website is received, and may be displayed along with a confirm/cancel button, for example.

In accordance with one embodiment, the push service icon may have a toggle function. The electronic device 501 may control on/off according to select the push service icon, thereby being capable of receiving/releasing a push message. When input (e.g., select "confirm" in the pop-up window or control the push service icon to become on) for receiving a push service from a website is detected through the pop-up window or the push service icon, the electronic device 501 may determine to receive the push service from the website.

In various embodiments of the present disclosure, the electronic device 501 may request (526) the ID of the electronic device 501 to the webpush provision server 505. In response to the request for the ID of the electronic device 501, the webpush provision server 505 may generate the ID of the electronic device 501. The webpush provision server 505 may transmit (527) the generated ID of the electronic device 501 to the electronic device 501. The electronic device 501 may receive the ID of the electronic device 501 from the webpush provision server 505. In order to receive the push service of the specific website, the electronic device 501 may transmit the ID of the electronic device 501 to the webpush provision server 505 or the website 503. Alternatively, the website 503 may obtain the ID from the electronic device 501.

In various embodiments of the present disclosure, when input for transmitting the push service (e.g., a push message) to the electronic device 501 is detected through the webpush transmission electronic device 502, the website 503 may transmit (530) the push message to the webpush provision server 505. For example, the website 503 may transmit (530) the push message to the webpush provision server 505. The webpush provision server 505 may fetch (533) a push API and transmit the push message to the push server 507. The push server 507 may transmit (535) the push message corresponding to the ID of the electronic device 501 to the electronic device 501. For example, the push server 507 may suitably change the push message received from the website 503 into the platform of the electronic device 501, and may transmit the changed push message to the electronic device 501. The electronic device 501 may output notification for the received push message through the service worker. For example, the electronic device 501 may display an indicator or pop-up window for the push service notification on the display unit. A user may check that the push service has been received from the specific website through the indicator or pop-up window for the push service notification displayed on the display unit. In accordance with one embodiment, the webpush transmission electronic device 502 may be the same as or similar to the electronic device 501.

Figure 6:
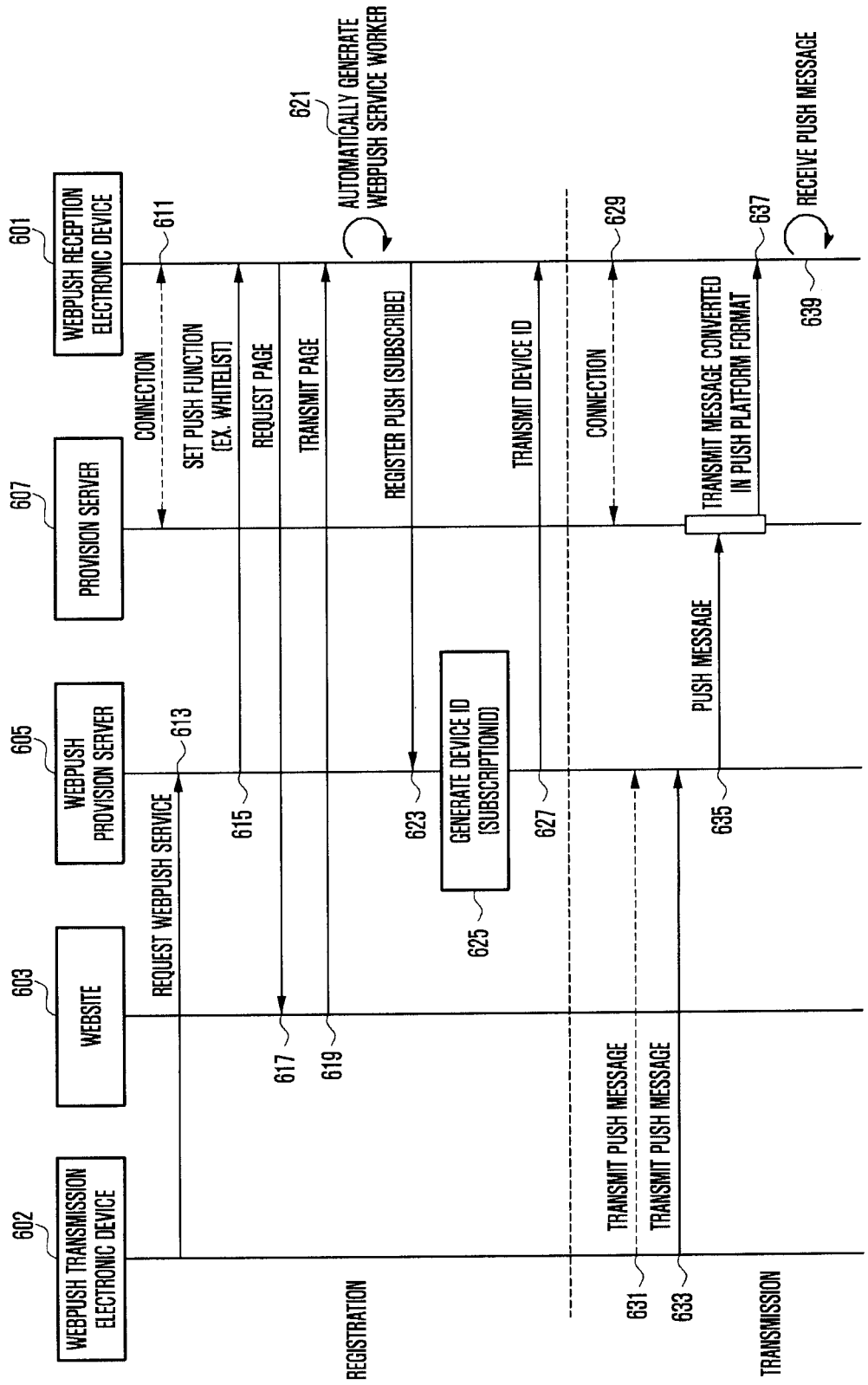
FIG. 6 is a diagram showing a signal flow between the electronic device and a server for illustrating a method of providing a push service using webpush according to various embodiments of the present disclosure.

FIG. 6 is a diagram showing a signal flow between the electronic device and the server for illustrating a method of providing a push service using webpush according to various embodiments of the present disclosure.

Referring to FIG. 6, the push server 607 (e.g., the push server 407 of FIG. 4, the push server 507 of FIG. 5) and the webpush reception electronic device 601 (e.g., the electronic device 401 of FIG. 4, the electronic device 501 of FIG. 5) may maintain (611) a connection state through the communication unit. The webpush transmission electronic device 602 (e.g., the webpush transmission electronic device 502 of FIG. 5) may request (613) a webpush service to the webpush provision server 605 (e.g., the webpush provision server 405 of FIG. 4, the webpush provision server 505 of FIG. 5) in order to provide the webpush reception electronic device 601 with a push service.

In various embodiments of the present disclosure, the webpush reception electronic device 601 may be the same as or similar to the electronic device 401 of FIG. 4 or the electronic device 501 of FIG. 5. Alternatively, the webpush reception electronic device 601 may be the same as or similar to the webpush transmission electronic device 602.

The webpush provision server 605 may register (e.g., add) the website 603 with a white list in response to the request for webpush service received from the website 603. The webpush provision server 605 may transmit (615) the white list to the webpush reception electronic device 601. The webpush reception electronic device 601 may store the white list received from the webpush provision server 605 in the memory.

In various embodiments of the present disclosure, the webpush reception electronic device 601 may request (617) a web page of a specific website, accessed through a web browser, to the website 603. The website 603 may transmit (619) the web page to the webpush reception electronic device 601. The webpush reception electronic device 601 may display the web page received from the website 603.

In various embodiments of the present disclosure, if the specific website is included in the white list, the webpush reception electronic device 601 may install (621) a service worker. When the service worker is installed, the webpush reception electronic device 601 may display a push service icon for receiving the push service of the website in at least some region (e.g., the address bar of the browser) of the display unit.

In accordance with various embodiments of the present disclosure, if a service worker has not been stored in the webpush reception electronic device 601, the webpush reception electronic device 601 may request the service worker to the webpush provision server 605. In response thereto, the webpush provision server 605 may transmit the service worker to the webpush reception electronic device 601. The webpush reception electronic device 601 may install the service worker received from the webpush provision server 605. When the service worker is installed, the webpush reception electronic device 601 may display a push service icon for receiving the push service of the website in at least some region (e.g., the address bar of the browser) of the display unit.

In various embodiments of the present disclosure, when input for selecting the push service icon is detected, the webpush reception electronic device 601 may request (623) the ID (e.g., subscriptionID) of the webpush reception electronic device 601 to the webpush provision server 605. The webpush provision server 605 may generate (625) the ID of the webpush reception electronic device 601 and transmit (627) the generated ID to the webpush reception electronic device 601. The webpush reception electronic device 601 may receive the ID of the webpush reception electronic device 601 from the webpush provision server 605. Alternatively, the website 603 may obtain the ID of the webpush reception electronic device 601 from the webpush reception electronic device 601.

In accordance with various embodiments of the present disclosure, the push server 607 and the webpush reception electronic device 601 through the communication unit may have been connected (629). The webpush transmission electronic device 602 may display a screen for writing the contents of a push message. For example, the screen for writing the contents of the push message may include a web admin screen or a management screen within a browser. In various embodiments of the present disclosure, the web admin screen may mean a web page having a function for displaying a screen for writing a push message through the webpush transmission electronic device 602, a function for writing push message contents based on the reception of input for writing the contents of the push message, and a function capable of transmitting the written push message to the webpush reception electronic device 601. The webpush transmission electronic device 602 may transmit (631) the push message written through the web admin screen to the webpush provision server 605. The webpush provision server 605 may transmit (635) the push message to the push server 607. The push server 607 may convert the push message, received from the webpush provision server 605, into a platform format corresponding to the ID of the webpush reception electronic device 601 based on the ID of the webpush reception electronic device 601. The push server 607 may transmit (637) the converted push message to the webpush reception electronic device 601. The webpush reception electronic device 601 may receive (639) the push message from the push server 607 and display the received push message.

In various embodiments of the present disclosure, if the contents of a push message are written using a management screen within the browser of the webpush transmission electronic device 602, the webpush transmission electronic device 602 may write the contents of a push message and then transmit (633) the written push message to the webpush provision server 605. The webpush provision server 605 may transmit (635) the push message to the push server 607. The push server 607 may transmit the push message, received from the webpush provision server 605, to the webpush Inception electronic device 601 based on the ID of the webpush reception electronic device 601. Alternatively, the push server 607 may convert the push message into a platform format corresponding to the ID of the webpush reception electronic device 601 and transmit (637) the push message to the webpush reception electronic device 601. The webpush reception electronic device 601 may receive (639) the push message from the push server 607 and display the received push message.

In various embodiments of the present disclosure, the electronic device (e.g., the electronic device 401 of FIG. 4, the electronic device 501 of FIG. 5) may display the user interface of a software program. When a first user input is detected in the user interface, the electronic device may receive a first web page from a first server (e.g., the website 403 of FIG. 4, the website 503 of FIG. 5, the website 603 of FIG. 6) related to a push service based on a user's subscription, and may display the first web page and an indicator for a push service. When a second user input for push service subscription is detected, the electronic device may transmit a signal indicative of the push service subscription to a second server (e.g., the webpush provision server 405 of FIG. 4, the webpush provision server 505 of FIG. 5, the webpush provision server 605 of FIG. 6) independent from the first server that manages a plurality of websites providing a push service.

In various embodiments of the present disclosure, the electronic device may receive data related to the push service from a third server (e.g., the push server 407 of FIG. 4, the push server 507 of FIG. 5, the push server 607 of FIG. 6) independent from the second server. The electronic device may output push service notification in response to the received data. [99] In various embodiments of the present disclosure, the electronic device may determine whether the first server provides a push service based on at least some of information of the second server.

In various embodiments of the present disclosure, the information may be a list including a plurality of websites providing the push service.

In various embodiments of the present disclosure, when the first server provides a push service, the electronic device may request a service worker necessary for the push service to the second server, may receive the service worker from the second server, and may install the received service worker.

In various embodiments of the present disclosure, when the first server provides a push service, the electronic device may identify whether a service worker necessary for the push service has been stored in the electronic device, and may install the service worker through the browser engine of the electronic device if, as a result of the identification, the service worker has been stored in the electronic device.

In various embodiments of the present disclosure, the electronic device may install the service worker and identify whether the second user input is detected in the indicator for the push service. When the second user input is detected in the indicator, the electronic device may request the ID of the electronic device to the second server and receive the ID of the electronic device from the second server.

In various embodiments of the present disclosure, the electronic device may transmit the received ID of the electronic device to the first server or the second server.

In various embodiments of the present disclosure, the electronic device may receive a push message corresponding to the II) of the electronic device from the third server through the service worker.

In various embodiments of the present disclosure, the indicator for the push service may include a pop-up window or push service icon regarding whether the push service is received.

Figure 7A:
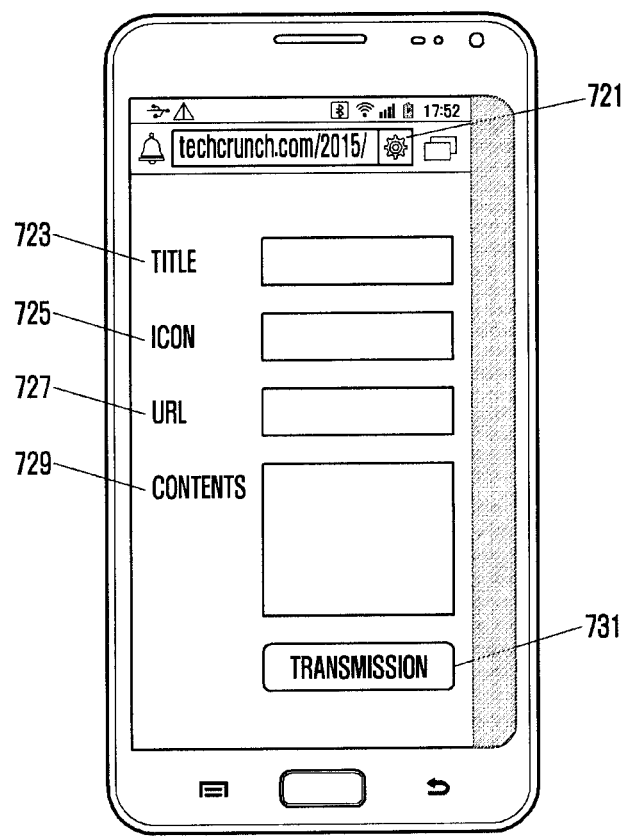
FIGS. 7A and 7B are diagrams for illustrating the writing of a webpush message in the electronic device according to various embodiments of the present disclosure.
Figure 7B:
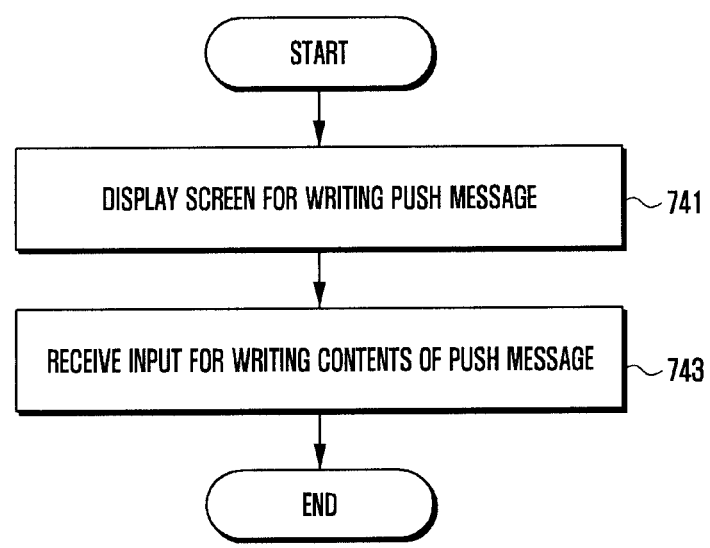

FIGS. 7A and 7B are diagrams for illustrating the writing of a webpush message in the electronic device according to various embodiments of the present disclosure.

In various embodiments of the present disclosure, FIG. 7A is a diagram for illustrating an interface in which a push message is written in the electronic device (e.g., the webpush transmission electronic device 502 of FIG. 5, the webpush transmission electronic device 602 of FIG. 6). FIG. 7B is a diagram for illustrating an operation of writing a webpush message in the electronic device.

Referring to FIG. 7A, according to various embodiments of the present disclosure, FIG. 7A is a diagram regarding the interface in which push message transmission contents are written in a management screen within a browser.

In accordance with one embodiment, the electronic device may access the interface in which push message transmission contents are written using administrator login information. For example, when the electronic device logs in to the interface as an administrator, the electronic device may display a push message writing screen, such as FIG. 7A. The push message writing screen may include a region in which a title 723, an icon 725, a URL 725, and contents 729 can be written. After a push message is written in the title 723, icon

725, URL 725, and contents 729, when input for selecting Send 731 is detected, the electronic device may transmit the written push message to a webpush provision server (e.g., the webpush provision server 405 of FIG. 4, the webpush provision server 505 of FIG. 5, the webpush provision server 605 of FIG. 6).

Referring to FIG. 7B according to various embodiments of the present disclosure, at operation 741, when a push message transmission request signal is received, the electronic device may display a screen for push message writing. At operation 743, the electronic device may receive input for writing the contents of a push message through the screen for push message writing. As described in FIG. 6, the push message may be written using a web admin screen or a management screen within a browser.

Figure 8A:
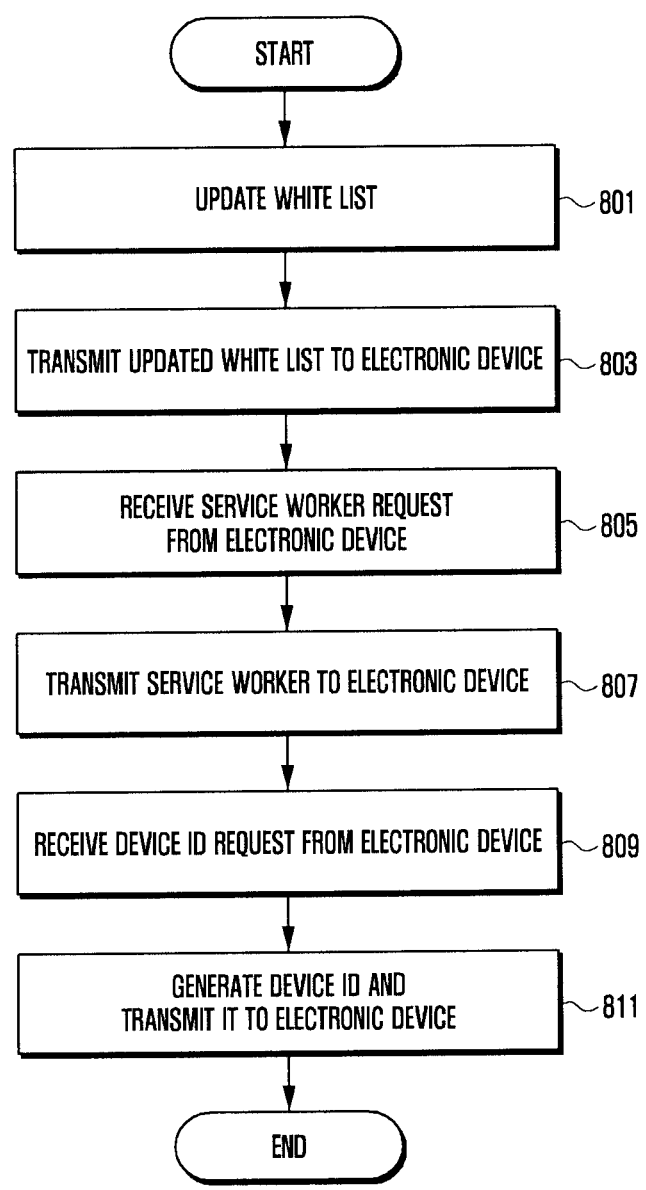
FIGS. 8A and 8B are diagrams for illustrating the operation of a webpush provision server according to various embodiments of the present disclosure.
Figure 8B:
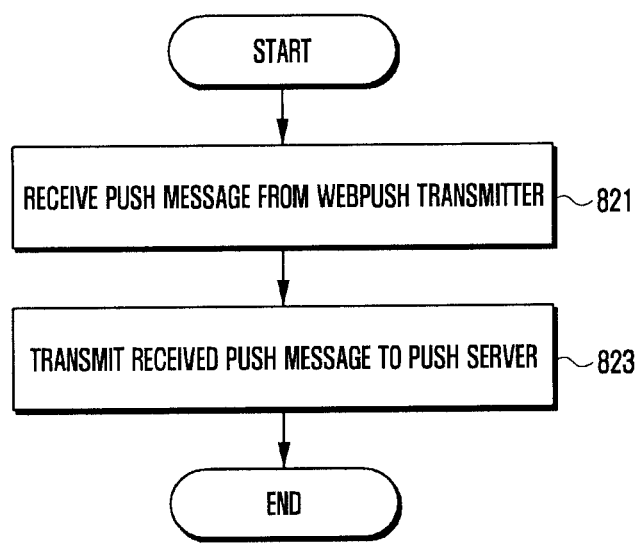

FIGS. 8A and 8B are diagrams for illustrating the operation of the webpush provision server according to various embodiments of the present disclosure.

In various embodiments of the present disclosure, FIG. 8A is a diagram for illustrating the push service registration operation of the webpush provision server (e.g., the webpush provision server 405 of FIG. 4, the webpush provision server 505 of FIG. 5, the webpush provision server 605 of FIG. 6). FIG. 8B is a diagram for illustrating the push service provision operation of the webpush provision server.

Referring to FIG. 8A according to various embodiments of the present disclosure, at operation 801, the webpush provision server may update a white list. For example, the webpush provision server may register a website that has requested a webpush service with the white list. At operation 803, the webpush provision server may transmit the updated white list to the electronic device (e.g., the webpush reception electronic device 601 of FIG. 6). For example, the webpush provision server may transmit the entire updated white list or only a website added to/changed in the white list to the electronic device (e.g., the electronic device 401 of FIG. 4, the electronic device 501 of FIG. 5, the webpush reception electronic device 601 of FIG. 6).

In various embodiments of the present disclosure, when a service worker request signal is received from the electronic device at operation 805, the webpush provision server may transmit a service worker to the electronic device at operation 807. When a device ID request is received from the electronic device at operation 809, the webpush provision server may generate the ID of the electronic device and transmit the generated ID to the electronic device at operation 811.

In various embodiments of the present disclosure, the aforementioned operation 805 and operation 807 may be omitted. For example, if the service worker has been stored in an electronic device web browser, the aforementioned operation 805 and operation 807 may be omitted.

Referring to FIG. 8B according to various embodiments of the present disclosure, at operation 821, the webpush provision server may receive a push message from the electronic device (e.g., the webpush transmission electronic device 502 of FIG. 5, the webpush transmission electronic device 602 of FIG. 6) of the administrator of a website (e.g., the website 403 of FIG. 4, the website 503 of FIG. 5, the website 603 of FIG. 6). At operation 823, the webpush provision server may fetch a push API and transmit the received push message to the push server (e.g., the push server 407 of FIG. 4, the push server 507 of FIG. 5, the push server 607 of FIG. 6).

FIGS. 9A to 9E are diagrams for illustrating an operation for the electronic device to receive a push message according to various embodiments of the present disclosure.

Figure 9A:
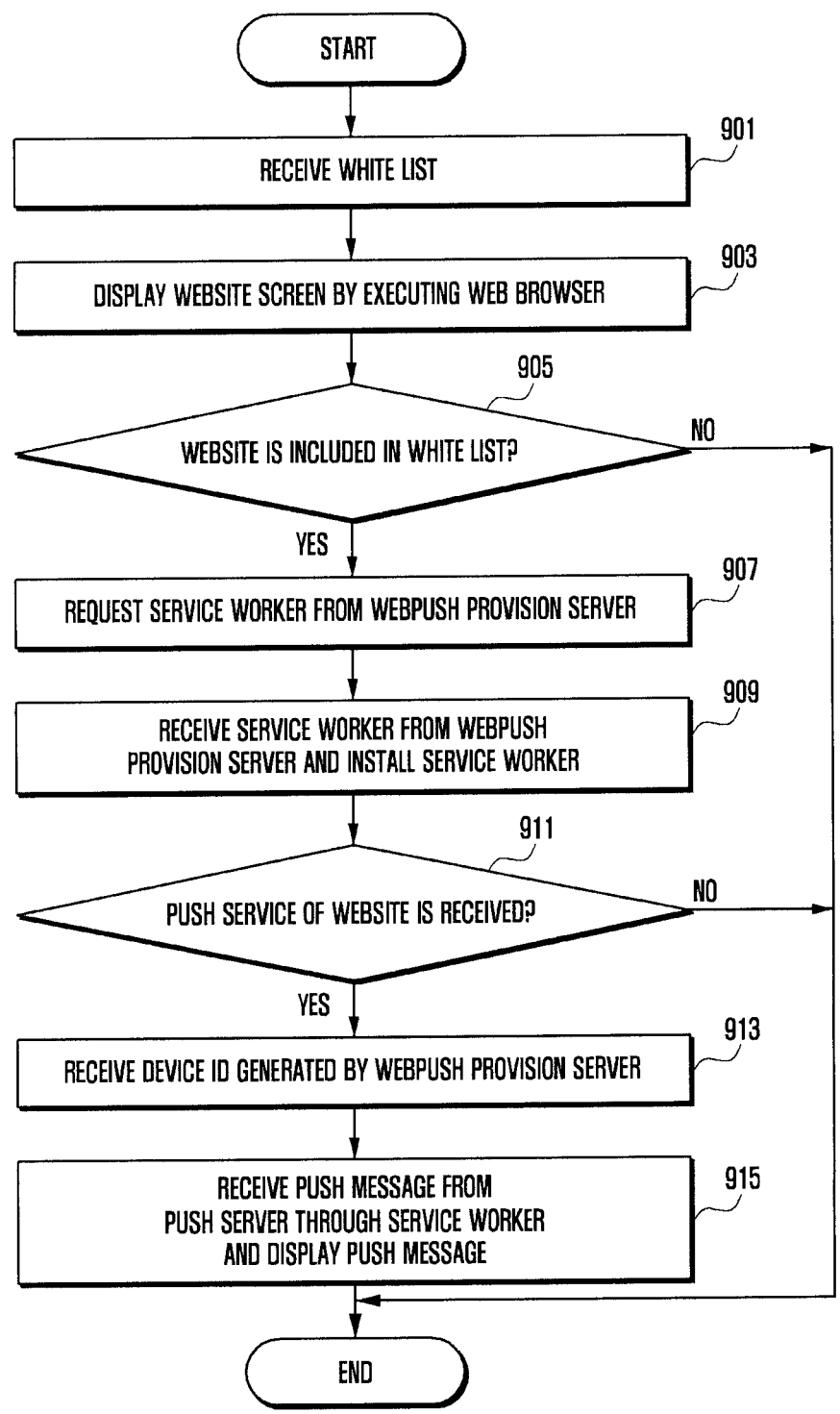
FIGS. 9A to 9E are diagrams for illustrating an operation for the electronic device to receive a push message according to various embodiments of the present disclosure.

Referring to FIG. 9A, the electronic device (e.g., the electronic device 401 of FIG. 4, the electronic device 501 of FIG. 5, the webpush reception electronic device 601 of FIG. 6) may receive a white list at operation 901. For example, the electronic device may receive the entire white list or only some (e.g., an added/changed website) of the white list from the webpush provision server (e.g., the webpush provision server 405 of FIG. 4, the webpush provision server 505 of FIG. 5, the webpush provision server 605 of FIG. 6), and may update it. This is described in detail later with reference to FIGS. 9B and 9C.

At operation 903, the electronic device may display a specific website screen by executing a web browser. At operation 905, the electronic device may determine whether the specific website has been included in the white list. If the specific website has been included in the white list, the electronic device may request a service worker to the webpush provision server (e.g., the webpush provision server 405 of FIG. 4, the webpush provision server 505 of FIG. 5, the webpush provision server 605 of FIG. 6) at operation 907. At operation 909, the electronic device may receive the service worker from the webpush provision server and install the received service worker.

In various embodiments of the present disclosure, after the service worker is installed, the electronic device may determine whether the push service of the website is received at operation 911. For example, when the service worker is installed, the electronic device may display a pop-up window regarding whether the push service of the website is received. The electronic device may be configured to receive input for receiving the push service from the website through the pop-up window. The electronic device may determine whether the push service is received from the website based on the input. Alternatively, when the service worker is installed, the electronic device may display a push service icon regarding whether the push service of the website is received. The push service icon may have a toggle function. When the push service icon is selected, it is controlled on/off so a push service is received or push service reception may be released.

In various embodiments of the present disclosure, the operation of determining whether the push service of a specific website is received has been illustrated as being executed at operation 911 after the service worker is installed at operation 909, but the present disclosure is not limited thereto. The electronic device may install the service worker of the operation 909 after the operation 911 of determining whether the push service of a specific website is received. For example, if the specific website has been included in the white list, the electronic device may display a pop-up window or push service icon regarding whether the push service of the specific website is received. When input for receiving the push service from the website is detected through the pop-up window or the push service icon, the electronic device may determine to receive the push service and request a service worker from the webpush provision server. The electronic device may receive the service worker from the webpush provision server and install the service worker.

In accordance with one embodiment, if the push message of the website is determined to be received at operation 911, the electronic device may generate the shortcuts icon of the website in the home screen of the electronic device. At operation 913, the electronic device may receive the ID of the electronic device generated by the webpush provision server in response to the request for the ID of the electronic device to the webpush provision server. At operation 915, the electronic device may receive a push message, changed into a push platform corresponding to the ID of the electronic device, from the push server (e.g., the push server 407 of FIG. 4, the push server 507 of FIG. 5, the push server 607 of FIG. 6) through the service worker of the electronic device, and may display the push message.

In various embodiments of the present disclosure, if it is determined that the specific website has not been included in the white list at operation 905 or the push service of the website has not been received at operation 911, the electronic device may terminate the operation of receiving a push service.

Figure 9B:
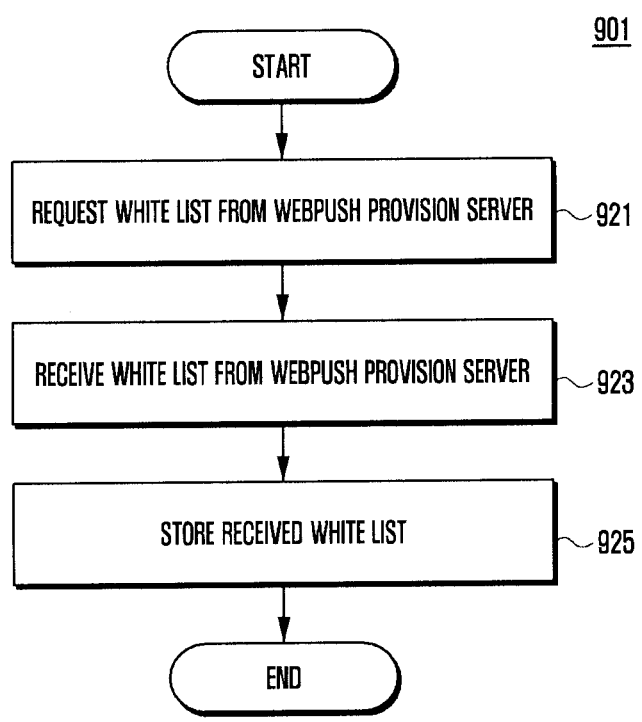
Figure 9C:
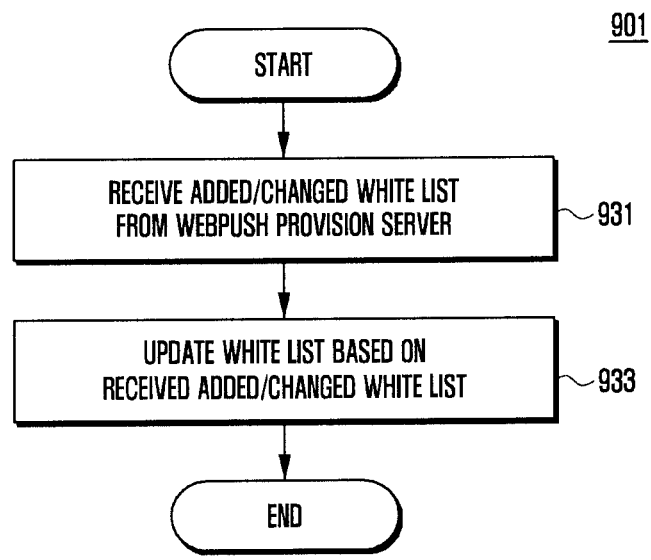

FIGS. 9B and 9C according to various embodiments of the present disclosure are diagrams illustrating the operation of receiving a white list at operation 901 of FIG. 9A described above.

Referring to FIG. 9B, at operation 921, the electronic device may request a white list to the webpush provision server. In response thereto, the electronic device may receive the white list from the webpush provision server at operation 923, and may store the received white list in the memory at operation 925.

Referring to FIG. 9C according to various embodiments of the present disclosure, at operation 931, the electronic device may receive an added/changed white list from the webpush provision server. For example, the electronic device may receive only an added/changed website in a white list previously received from the webpush provision server. At operation 933, the electronic device may update a white list stored in the memory based on the received added/changed white list.

Figure 9D:
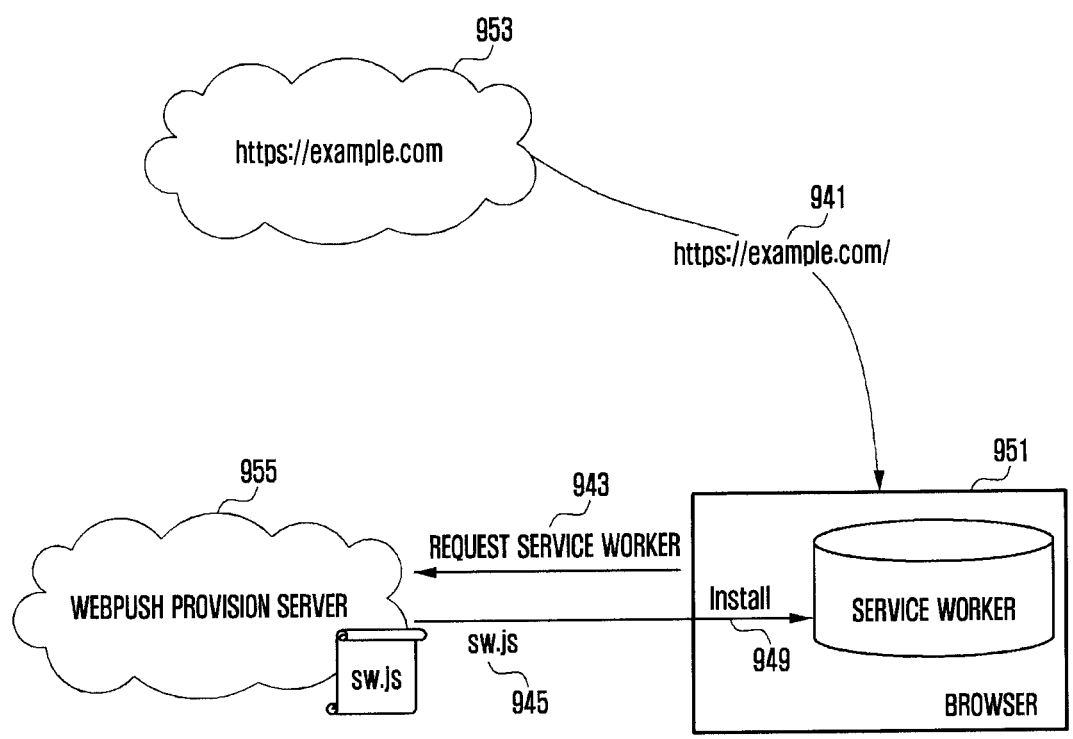

FIG. 9D is a diagram for illustrating an operation of requesting and receiving a service worker from the webpush provision server if the website accessed through the web browser described above is included in the white list.

Referring to FIG. 9D, an electronic device 951 (e.g., the electronic device 401 of FIG. 4, the electronic device 501 of FIG. 5, the webpush reception electronic device 601 of FIG. 6) may receive (941) a page of a website 953 (e.g., the website 403 of to FIG. 4, the website 503 of FIG. 5, the website 603 of FIG. 6), for example, https://example.com, by executing a web browser, and may display the received page. The electronic device 951 may determine whether the website https://example.com is included in a white list stored in the memory (e.g., the memory 420 of FIG. 4). If the website https://example.com is included in the white list, the electronic device 951 may request (943) a service worker (sw.js) necessary for a webpush service to a webpush provision server 955 (e.g., the webpush provision server 405 of FIG. 4, the webpush provision server 505 of FIG. 5, the webpush provision server 605 of FIG. 6). In response to the request for the service worker, the webpush provision server 955 may transmit (945) the service worker to the electronic device 951. The electronic device 951 may install (949) the service worker received from the webpush provision server 955.

Figure 9E:
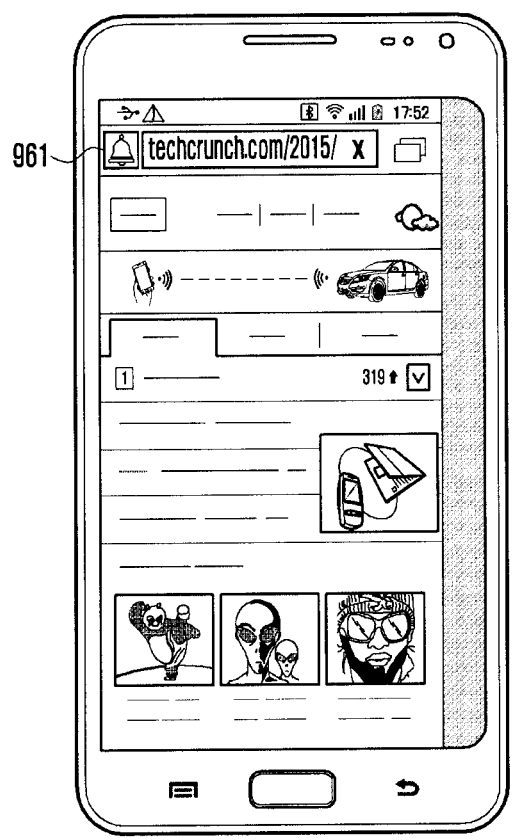

FIG. 9E is a diagram regarding an interface in which the electronic device determines whether the push service of a specific website is received.

In accordance with one embodiment, if a specific website is determined to be included in a white list, when a service worker is installed, the electronic device may display a push service icon 961 in some region of the address bar of a web browser as shown in FIG. 9E. When input to select the push service icon 961 is detected and thus the push service icon 961 is activated, the electronic device may determine that the push service of the website is received. When the selection input is detected again in the state in which the push service icon 961 has been activated, the electronic device may determine that the reception of a push message is released. For example, the push service icon 961 may have a toggle function. When the push service icon 961 is selected, it is controlled on/off, so a push message may be received or the reception of a push message may be released. The push service icon 961 has been illustrated as being displayed in some region of a web browser address bar, but is not limited thereto. The push service icon 961 may be displayed in at least some region of the display unit (e.g., the display unit 431 of FIG. 4).

Figure 10A:
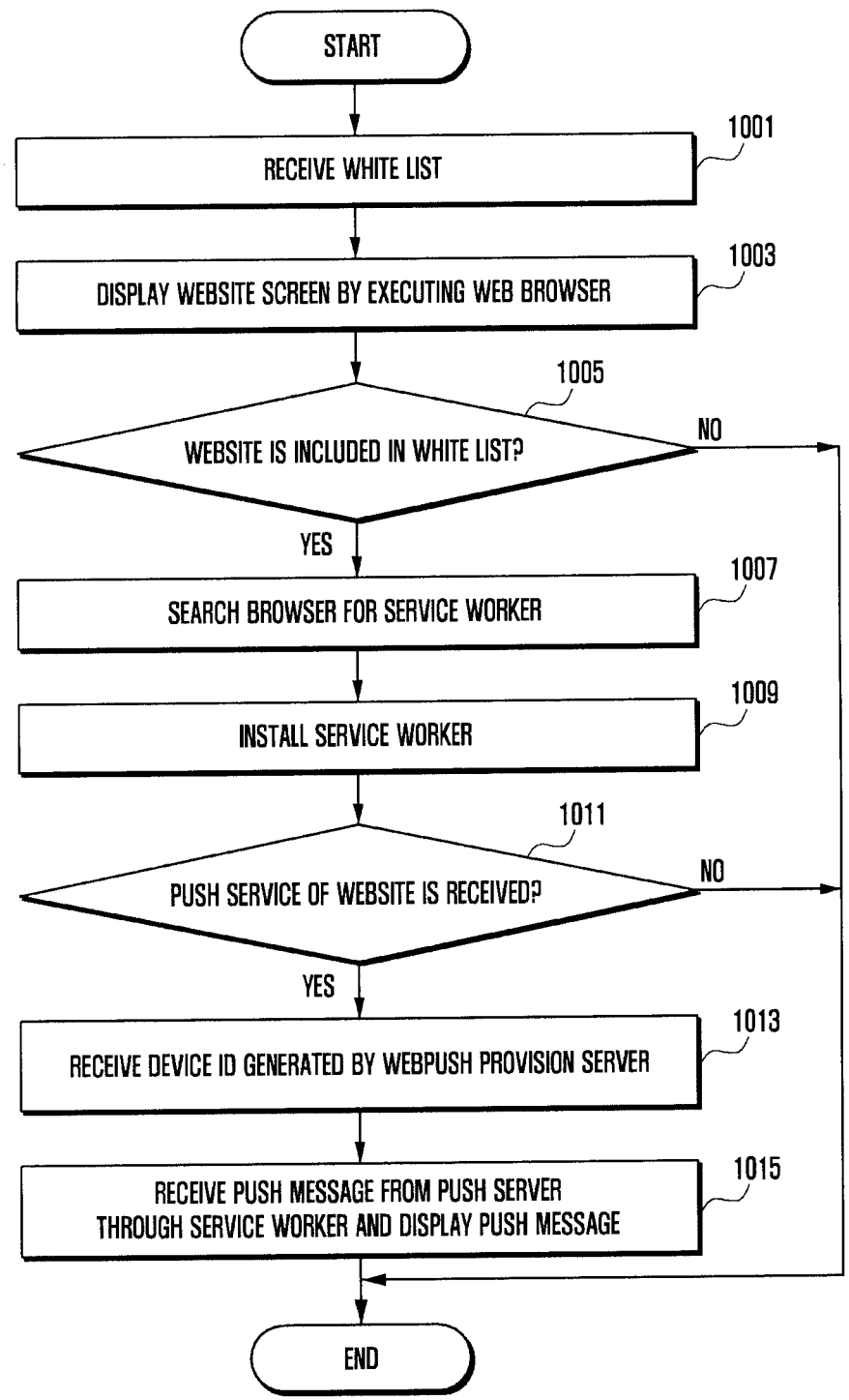
FIGS. 10A and 10B are diagrams for illustrating an operation for the electronic device to receive a push service according to various embodiments of the present disclosure.
Figure 10B:
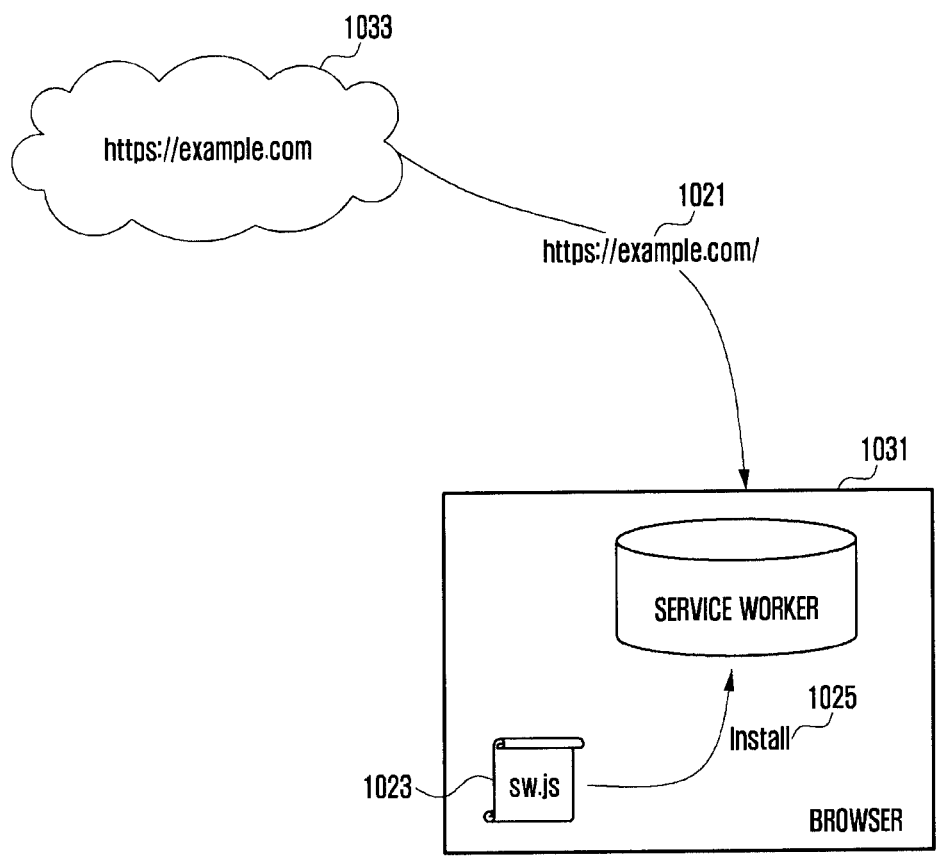

FIGS. 10A and 10B are diagrams for illustrating an operation for the electronic device to receive a push service according to various embodiments of the present disclosure.

The electronic device may be the same as or similar to the electronic device 101 of FIG. 1, the electronic device 401 of FIG. 4, the electronic device 501 of FIG. 5, the webpush transmission electronic device 602 of FIG. 6 or the webpush reception electronic device 601 of FIG. 6.

Referring to FIG. 10A, the electronic device may receive a white list at operation 1001. For example, the electronic device may receive the entire white list or only some (e.g., an added/changed website) of the white list from the webpush provision server (e.g., the webpush provision server 405 of FIG. 4, the webpush provision server 505 of FIG. 5, the webpush provision server 605 of FIG. 6), and may update it.

At operation 1003, the electronic device may display a specific website screen by executing a web browser. At operation 1005, the electronic device may determine whether the specific website is included in the white list. If the specific website is included in the white list, the electronic device may search the web browser of the electronic device whether a service worker is present in the web browser at operation 1007. If the service worker is present in the web browser, the electronic device may install the service worker at operation 1009.

After the service worker is installed, the electronic device may determine whether the push service of the website is received at operation 1011. The operation 1011 is similar to or identical with the operation 911 of FIG. 9A described above, and thus a detailed description thereof is omitted.

In accordance with various embodiments of the present disclosure, the electronic device may search the web browser whether a service worker is present in the web browser and install the service worker if the service worker is present in the web browser at operation 1007 and operation 1009. At operation 1011, the electronic device may determine whether the push service of the specific website is received. Alternatively, after whether the push service of the specific website is received is determined at operation 1011, the electronic device may search the web browser whether a service worker is present in the web browser and install the service worker if the service worker is present in the web browser at operation 1007 and operation 1009.

In accordance with various embodiments of the present disclosure, if it is determined that the push service of the website is received, the electronic device may generate the shortcuts icon of the website in the home screen of the electronic device. At operation 1013, the electronic device may receive the ID of the electronic device generated by the webpush provision server in response to a request for the ID of the electronic device to the webpush provision server. At operation 1015, the electronic device may receive a push message, changed into a push platform corresponding to the ID of the electronic device, from the push server through the service worker, and may display the push message.

In various embodiments of the present disclosure, if it is determined that the specific website is not included in the white list at operation 1005 or the push service of the website is not received at operation 1011, the electronic device may terminate the operation of receiving a push service.

FIG. 10B is a diagram for illustrating an operation of installing a service worker stored in a web browser within the electronic device if a website accessed through the web browser is included in a white list.

Referring to FIG. 10B, the electronic device 1031 may receive (1021) a page of a website 1033 (e.g., the website 403 of FIG. 4, the website 503 of FIG. 5, the website 603 of FIG. 6) for example, https://example.com, by executing a web browser, and may display the page. The electronic device 1031 may determine whether the website https://example.com is included in a white list. If the website https://example.com is included in the white list, the electronic device 1031 may install (1025) a service worker 1023 necessary for a stored webpush service within the browser.

Figure 11:
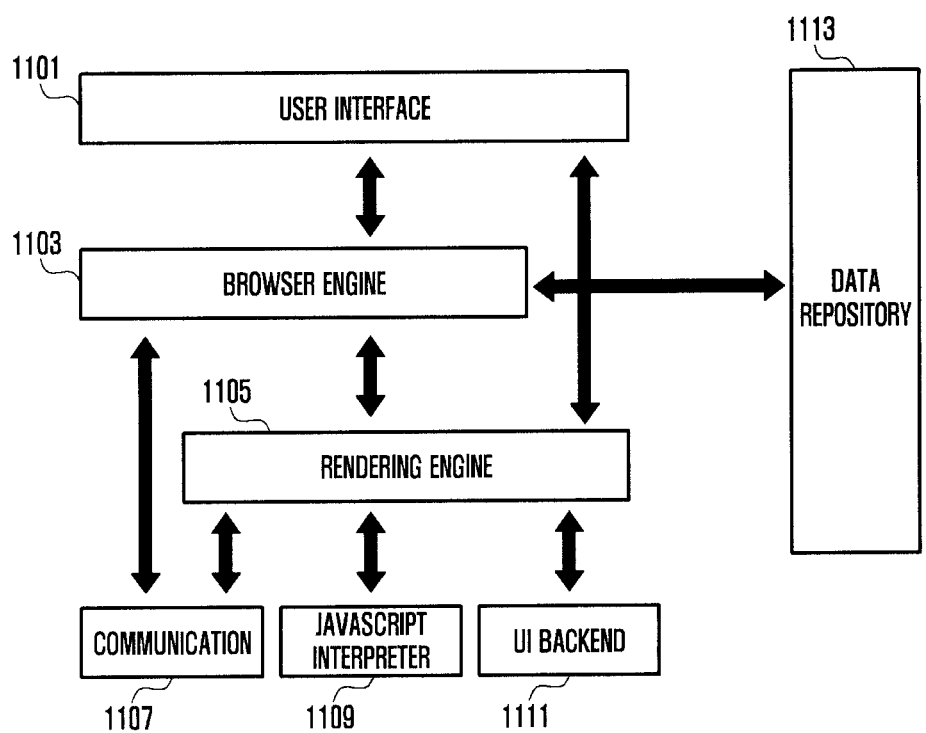
FIG. 11 is a diagram for illustrating elements forming a browser of the electronic device according to various embodiments of the present disclosure.

FIG. 11 is a diagram for illustrating elements forming a web browser of the electronic device according to various embodiments of the present disclosure. The electronic device may be the same as or similar to the electronic device 101 of FIG. 1, the electronic device 401 of FIG. 4, the electronic device 501 of FIG. 5, the webpush transmission electronic device 602 of FIG. 6 or the webpush reception electronic device 601 of FIG. 6.

Referring to FIG. 11, in various embodiments of the present disclosure, the web browser may include a user interface 1101, a browser engine 1103, a rendering engine 1105, communication 1107, a Javascript interpreter 1109, a UI backend 1111, and a data repository 1113.

The user interface 1101 may include the remaining UIs other than windows displaying requested pages, such as an address bar, a previous/next button, and a bookmark menu.

In various embodiments of the present disclosure, at operation for the electronic device to agree on push service reception, the user interface 1101 may determine whether a website requested by a user through the web browser is included in a white list through the browser engine 1103. If the website is included in the white list, the user interface 1101 may display a push service icon or pop-up window regarding whether a push service is received.

In various embodiments of the present disclosure, at operation for the electronic device to receive a push service, the user interface 1101 may display a pop-up window for push service notification. The pop-up window may include at least one of a title, an icon, and a URL capable of movement upon selection. Alternatively, the user interface 1101 may display a push service notification icon in a state bar for push service notification.

The browser engine 1103 may control an operation between the user interface 1101 and the rendering engine 1105. The browser engine 1103 may load information stored in the data repository 1115 and perform a web browser function (e.g., cache, cookies).

In various embodiments of the present disclosure, at operation for the electronic device to determine to receive a push service, the browser engine 1103 may request a service worker necessary for the push service to the webpush provision server and install the service worker. The browser engine 1103 may identify whether a website requested by a user through the web browser is included in a white list. If the website is included in the white list, the browser engine 1103 may install the service worker and store it in the data repository 1113. If the website is included in the white list, the browser engine 1103 may display a push service icon or pop-up window regarding whether the push service is received in the user interface 1101.

In various embodiments of the present disclosure, at operation for the electronic device to receive a push service, the browser engine 1103 may receive a push message transmitted through the communication 1107 and fetch a service worker stored in the data repository 1113. At operation of agreeing on the reception of a push service when a service worker is requested, the browser engine 1103 may return the service worker stored in the data repository 1113. The service worker may include script that generates a pop-up window for push message notification.

The rendering engine 1105 may display requested content. For example, when an HTML is requested, the rendering engine 1105 may parse the HTML and CSS and display them on a screen.

The communication 1107 may perform a network call, such as an HTTP request, and perform transmission/reception along with the rendering engine 1105. Such communication is an interface independent of a platform and may be executed under each platform.

In various embodiments of the present disclosure, at operation of agreeing on the reception of a push service, when a service worker is received through the webpush provision server and installed, the communication 1107 may communicate with the webpush provision server in order to update a white list of a website authenticated by the browser engine 1103 (e.g., if a website from which a push service has been requested is registered with the webpush provision server) and a white list within the data repository 1113. When input to receive the push service of a website from the electronic device is detected, the communication 1107 may perform communication in order to receive the ID of the electronic device from the webpush provision server.

In various embodiments of the present disclosure, at operation of receiving a push service, the communication 1107 may receive push message payload transmitted by a website and transmit it to the browser engine 1103.

The UI backend 1109 is a common interface not specified in a platform, such as a combo box, and may use an operating system (OS) user interface system.

The Javascript interpreter 1111 may interpret and execute Javascript code.

The data repository 1113 may store cookies, cache or data.

In various embodiments of the present disclosure, at operation for the electronic device to agree on the reception of a push service, the data repository 1113 may store a website from which a push service has been requested by adding the website to a white list. The data repository 1113 may periodically update a white list stored in the data repository 1113.

The invention claimed is:
1. An electronic device, comprising:
a communication unit configured to form wired/wireless communication;
a display unit;
an input unit separated from or coupled to the display unit;
memory configured to store a software program configured at least partially for web browsing; and
a processor electrically connected to the communication unit, the display unit, the input unit, and the memory, wherein the memory stores instructions for the processor to:

receive a first web page from a first server related to a push service via the web browsing, identify whether the first web page is included in a white list received from a second server, wherein the white list including a plurality of websites providing the push service, identify, if the first web page is included in the white list, whether a service worker for receiving the push service of the first web page is stored in the electronic device, install, if the service worker is stored in the electronic device, the service worker, display, in response to installation of the service worker, an indicator for setting push service subscription of the first web page in at least a portion of the first web page, transmit, in response to detection of a user input on the indicator, a signal for request of the push service subscription to the second server, receive the push service of the first web page from the second server, and display, on the display unit, a user interface for the received push service using the service worker.

2. The electronic device of claim 1, wherein the instructions comprise instructions for the processor to:

receive data related to the push service from a third server through the communication unit, and provide push service notification through the display unit in response to the received data.

3. The electronic device of claim 1, wherein the instructions comprise instructions for the processor to:

request, if the service worker is not stored in the electronic device, the service worker for the push service to the second server, receive the service worker from the second server, and install the service worker.

4. The electronic device of claim 3, wherein the instructions comprise instructions for the processor to:

transmit, in response to detection of a user input on the indicator, a request to generate a subscription ID of the electronic device to the second server, and receive the subscription ID of the electronic device from the second server.

5. The electronic device of claim 4, wherein the instructions comprise instructions for the processor to transmit the received subscription ID of the electronic device to the first server.

6. The electronic device of claim 5, wherein the instructions comprise instructions for the processor to receive a push message corresponding to the ID of the electronic device from a third server through the service worker.

7. The electronic device of claim 1, wherein the indicator for the push service comprises a pop-up window or push service icon regarding whether the push service is received.

8. A method for an electronic device to provide a push service, the method comprising:

receiving a first web page from a first server related to the push service via web browsing;

identifying whether the first web page is included in a white list received from a second server, wherein the white list including a plurality of websites providing the push service, identifying, if the first web page is included in the white list, whether a service worker for receiving the push service of the first web page is stored in the electronic device, installing, if the service worker is stored in the electronic device, the service worker;

displaying, in response to installation of the service worker, an indicator for setting push service subscription of the first web page in at least a portion of the first web page;

transmitting, in response to detection of a user input on the indicator, a signal for request of the push service subscription to a second server;

receiving the push service of the first web page from the second server; and displaying, on a display unit, a user interface for the received push service using the service worker.

9. The method of claim 8, further comprising:

receiving data related to the push service from a third server; and outputting push service notification in response to the received data.

10. The method of claim 8, further comprising:

requesting, if the service worker is not stored in the electronic device, the service worker for the push service to the second server;

receiving the service worker from the second server; and installing the received service worker.

11. The method of claim 10, further comprising:

transmitting, in response to detection of a user input on the indicator, a request to generate a subscription ID of the electronic device to the second server;

receiving the subscription ID of the electronic device from the second server;

transmitting the subscription ID of the electronic device to the first server; and receiving a push message corresponding to the ID of the electronic device from a third server through the service worker.

\* \* \* \* \*